US012104428B2

(12) United States Patent
Lee

(10) Patent No.: US 12,104,428 B2
(45) Date of Patent: Oct. 1, 2024

(54) EMERGENCY BRAKE DEVICE FOR OCCURRENCE OF ACCELERATION OF ELEVATOR DOOR

(71) Applicant: JOKANGFOD CO., LTD., Gwangmyeong-Si (KR)

(72) Inventor: Kyong Kyu Lee, Seoul (KR)

(73) Assignee: JOKANGFOD CO., LTD. (KR)

( * ) Notice: Subject to any disclaimer, the term of this patent is extended or adjusted under 35 U.S.C. 154(b) by 0 days.

(21) Appl. No.: 18/036,363

(22) PCT Filed: Nov. 3, 2021

(86) PCT No.: PCT/KR2021/015818

§ 371 (c)(1),
(2) Date: May 10, 2023

(87) PCT Pub. No.: WO2022/103061

PCT Pub. Date: May 19, 2022

(65) Prior Publication Data

US 2024/0003175 A1 Jan. 4, 2024

(30) Foreign Application Priority Data

Nov. 12, 2020 (KR) ........................ 10-2020-0151343

(51) Int. Cl.
*E05F 5/00* (2017.01)

(52) U.S. Cl.
CPC ......... *E05F 5/003* (2013.01); *E05Y 2900/104* (2013.01)

(58) Field of Classification Search
CPC ......... E05F 5/003; E05F 16/684; E05F 16/40; E05Y 2900/104; E05Y 2900/106;
(Continued)

(56) References Cited

U.S. PATENT DOCUMENTS 6,279,268 B1 * 8/2001 Beaudoin .............. E05D 13/006 160/193
7,484,332 B2 * 2/2009 Hormann .............. E05D 13/006 49/200

(Continued)

FOREIGN PATENT DOCUMENTS

JP H09268856 A 10/1997
JP 2007177489 A 7/2007

(Continued)

OTHER PUBLICATIONS

International Search Report for PCT/KR2021/015818, mailed Feb. 10, 2022.

*Primary Examiner* — Jerry E Redman
(74) *Attorney, Agent, or Firm* — Renaissance IP Law Group LLP

(57) ABSTRACT

An emergency brake device for occurrence of acceleration of an elevator door of the present inventive concept is fixedly installed at both lower ends of the elevator door and moves up along a guide rail, and may be configured comprising: a fixing bracket (110) secured to the elevator door; an acceleration prevention device (100) installed in a front inner side of the fixing bracket (110) and causing a braking force when a door downward speed of the elevator door accelerates above a regulation speed; a braking blade driving mechanism (150) which receives the braking force of the acceleration prevention device (100) and brings a braking blade (151) into contact with the guide rail (300), thereby stopping the door downward movement of the elevator door; and a braking force transmission system for transmitting the braking force between the acceleration prevention device (100) and the braking blade driving mechanism (150).

19 Claims, 14 Drawing Sheets

(58) Field of Classification Search

CPC ........... E05Y 2900/132; E05Y 2201/21; E05Y 2201/232; E05Y 2201/26; E05Y 2201/408; E05Y 2201/484; E05Y 2800/40; E05D 13/006; E06B 9/84

USPC ........................................................... 49/322

See application file for complete search history.

(56) References Cited

U.S. PATENT DOCUMENTS

| | | | | |
|---|---|---|---|---|
| 7,600,344 | B2 * | 10/2009 | Michaud | E05D 13/006 49/322 |
| 7,610,719 | B2 * | 11/2009 | Hsieh | E05F 1/006 160/4 |
| 8,528,256 | B2 * | 9/2013 | Haba | F16D 63/008 49/322 |
| 10,000,960 | B2 * | 6/2018 | Angiuli | E05F 15/40 |
| 11,578,525 | B2 * | 2/2023 | Williams | E05F 15/686 |
| 11,643,861 | B2 * | 5/2023 | Williams | E05D 13/003 49/199 |
| 2003/0041520 | A1 * | 3/2003 | Mullet | E05D 13/006 49/322 |
| 2010/0005723 | A1 * | 1/2010 | Evans | E05F 15/668 49/322 |
| 2012/0279131 | A1 * | 11/2012 | Haba | E05D 13/006 188/166 |
| 2024/0003175 | A1 * | 1/2024 | Lee | E05F 5/003 |

FOREIGN PATENT DOCUMENTS

| | | | |
|---|---|---|---|
| JP | 2007204962 | A | 8/2007 |
| KR | 200329070 | Y1 | 10/2003 |
| KR | 100695956 | B1 | 3/2007 |
| KR | 102265278 | B1 | 6/2021 |

* cited by examiner

EMERGENCY BRAKE DEVICE FOR OCCURRENCE OF ACCELERATION OF ELEVATOR DOOR

TECHNICAL FIELD

The present disclosure relates to an emergency brake device for occurrence of acceleration of an elevator door, which automatically stops a door that opens or closes in an elevation manner when the door accelerates and lowers due to a failure.

BACKGROUND ART

Elevator doors are often installed in entrances of garages or warehouses, and since the doors are stored in upper portions of the entrances when the entrances are opened, spaces near the entrances can be efficiently used.

Types of elevator doors include “overhead doors”, “shutters”, “speed doors”, “stacking doors”, and the like.

As illustrated in FIG. 11, in a general door elevation method for the elevator door, elevation guides are installed on lower ends of both sides of the door, hoist wires or chains are connected to the elevation guides. Thus, when the door raises, the hoist wires or the chains are wound up with a motor, and when the door lowers, the motor is turned and released in an opposite direction.

However, when a failure such as cutting the hoist wire or chain occurs in a conventional elevator door operating as described above, the door rapidly falls, thereby causing unexpected loss of a human life or damage to passing vehicles.

Thus, in many cases, a safety device capable of achieving an emergency brake when the door rapidly falls is installed in the elevator door.

An example of the elevator door in which an emergency brake device is installed is illustrated in FIGS. 13 to 15. Korean Patent Registration No. 10-0695956 disclosures the elevator door illustrated in FIGS. 13 to 15, which is of an “overhead door” type.

In the related art, a door panel is elevated by the hoist wire, and the falling of the door is prevented using an elevation guide having an emergency brake function.

Referring to FIGS. 13 to 15, in the related art, an elevation guide 1 is mounted on both sides of a lower end door panel 3. A lower end of a wire 2 is connected to a wire connector 7 of the mounted elevation guide 1.

Thus, when the wire 2 is normally wound around a drum (not illustrated), the wire 2 is pulled tight due to a weight of the door panels 3, and an upward pulling force is applied to the wire connector 7 installed on a rear side of a rotary bracket 8.

In this case, a clockwise rotational force is generated in the rotary bracket 8 coupled to the wire connector 7, and as illustrated in FIG. 14, a brake shoe 5 mounted on a support member 9' of a brake frame 9 coupled to the rotary bracket 8 is maintained horizontally with a small gap from a guide rail 4 (for more detailed technical information, refer to Korean Patent Registration No. 10-0695956).

In this state, when a motor (not illustrated) is operated to roll up or unwind the wire 2, the elevation guide 1 elevates the entire door panel 3 while elevating along the guide rail 4. In this case, a guide roller 6 mounted on the elevation guide 1 elevates while rotating while inserted into the guide rail 4.

Further, when an accident in which the wire 2 is cut occurs during the above elevation operation, as illustrated by a dotted line in FIG. 14, a wire 2' is stretched, and a wire connector 7' is also stretched after a tensile force is released.

Accordingly, the rotary bracket 8 and the brake shoe 5 coupled to the wire connector 7' rotate counterclockwise as illustrated by the dotted line, and as a result, the brake shoe 5 causes friction while in contact with an outer surface of the guide rail 4. The rapid falling of the door panel 3 is stopped due to this friction.

As viewed in FIG. 15, the counterclockwise rotation of the rotary bracket 8 and the brake shoe 5 is generated by a force that pushes the support member 9' upward due to elasticity of a spring head S' of a torsion spring S wound around a roller shaft 6'.

However, in the conventional fall prevention device, when a fall load of the door panel 3 is large, the fall prevention device slides downward together with the door panel, and thus the brake shoe 5 is pushed and opened to a right side (clockwise). In this case, a frictional force between the outer surface of the guide rail 4 and the brake shoe 5 disappears, and the door panel 3 cannot be prevented from falling.

Further, in the related art, when the hoist wire 2 is not cut and the door panel falls due to another accident such as a motor failure while a tensile force of the hoist wire 2 is maintained, an emergency brake device may not operate. In recent years, human accidents have occurred in Korea due to this problem.

DISCLOSURE

Technical Problem

The present inventive concept is directed to providing an emergency brake device for an elevator door, in which, when a braking blade operates to cause contact between an outer surface of a guide rail and the braking blade, even when a falling load of a door panel is very large, strong contact between the outer surface of the guide rail and the braking blade may be maintained without sliding.

Further, the present inventive concept is directed to also providing an emergency brake device for an elevator door, which automatically operates in response to falling of a door at a specified speed or more regardless of whether a hoist wire or chain is cut.

Further, the present inventive concept is directed to also providing an emergency brake device for an elevator door, which may stop a door that accelerates and falls only with a roller interlocked with an operation of the acceleration prevention device without using the braking blade when a door load is relatively small as in a small elevator door.

Technical Solution

One aspect of the present inventive concept provides an emergency brake device for an elevator door fixedly mounted on both ends of an elevator door and elevating along a guide rail, the emergency brake device including a fixing bracket coupled to and installed in the elevator door, an acceleration prevention device that is installed inside a front side of the fixing bracket and generates a braking force when a door lowering speed of the elevator door increases to a specified speed or more, a braking blade movable tool that receives a braking force of the acceleration prevention device to bring a braking blade into contact with the guide rail so as to stop the lowering of the elevator door, and a braking force transmission tool that transmits a braking force between the acceleration prevention device and the braking blade movable tool.

A pressing roller part that presses the guide rail and operates may be installed to interlock with the acceleration prevention device.

The braking blade movable tool may include a braking shaft to which the braking blade is connected at one end thereof and an elastic body coupled to and installed in the braking shaft, and the braking shaft may be rotatably installed in the fixing bracket.

The elastic body coupled to and installed in the braking shaft may be installed such that a spring body surrounds the braking shaft, one spring tail is coupled to the braking shaft, and a rotational force is always applied to the braking shaft.

The braking force transmission tool may include a driving sprocket coupled to interlock with the acceleration prevention device, a driven sprocket installed to interlock with the braking blade movable tool, and a connection chain connecting the driving sprocket and the driven sprocket.

The braking force transmission tool may include a connection rod having one end rotatably connected to the acceleration prevention device and a lower arm having one end installed to interlock with the braking blade movable tool, and the other end of the connection rod and the other end of the lower arm may be coupled to rotate relative to each other.

The emergency brake device may further include a movable bracket coupled to an inside of the fixing bracket to swing forward or rearward, wherein the acceleration prevention device is positioned inside the movable bracket and swings forward or rearward together with the movable bracket.

The fixing bracket and the movable bracket may be connected through a pressing elastic body, and the movable bracket may be installed in a state in which an elastic force pulled toward the fixing bracket is applied to the movable bracket.

A timing adjustment tool that adjusts a position of a stop groove formed in an inner circumferential surface of an outer body of the acceleration prevention device may be installed in the fixing bracket.

The timing adjustment tool may include an adjustment piece formed of a long metal piece, a fixing bolt that fixes a position of an upper end of the adjustment piece, and an adjustment bolt that adjusts a position of a lower end of the adjustment piece.

The acceleration prevention device may include a rotating body which has a shape of a disc and in which an accommodation groove recessed toward an inside of the disc is formed in an outer circumferential surface of the disc and a center shaft is installed at a center of the disc, an outer body which is installed in a fixed state to surround an outer circumferential surface of the rotating body and in which an empty space accommodating the rotating body in a rotatable state is formed and a stop groove recessed toward an outside is formed in an inner circumferential surface forming the empty space, and a moving body accommodated inside the accommodation groove to move in a lengthwise direction of the accommodation groove, and a protrusion may be formed on one side of the acceleration prevention device.

The rotating body may have a plurality of accommodation grooves, and the plurality of formed accommodation grooves may be arranged at equal intervals.

The accommodation groove of the rotating body may be an accommodation groove in which an axial line extending from a center axis of the accommodation groove forms a vertical distance without passing through a center of the center axis.

Another aspect of the present inventive concept provides an emergency brake device, in the case of a door load being relatively small as in a small elevator door, the emergency brake device including a fixing bracket coupled to and installed in the elevator door, an acceleration prevention device that is installed inside a front side of the fixing bracket and generates a braking force when a door lowering speed of the elevator door increases to a specified speed or more, and a pressing roller part that presses the guide rail and operates while interlocking with the acceleration prevention device.

A movable bracket coupled to swing forward or rearward may be provided inside the fixing bracket, the pressing roller part may include a pressing roller shaft coupled to pass through the movable bracket to swing forward or rearward together with the movable bracket and a pressing roller coupled to one end of the pressing roller shaft, and contact and separation may occur between the pressing roller and the guide rail according to the forward or rearward swinging of the movable bracket.

The acceleration prevention device may be installed in the pressing roller shaft, an adjustment rod may be formed on one side surface of the acceleration prevention device, and the acceleration prevention device may operate according to a rotational speed of the pressing roller.

A timing adjustment tool that adjusts a position of a stop groove formed in an inner circumferential surface of an outer body of the acceleration prevention device may be installed in the movable bracket.

The timing adjustment tool may include an adjustment table formed of a long metal piece, an adjustment bolt that adjusts a vertical position of the adjustment table, and a third slot formed vertically long in the adjustment table.

The fixing bracket and the movable bracket may be connected through a pressing elastic body, and the pressing elastic body may apply an elastic force for pressing the guide rail to the pressing roller coupled to the movable bracket.

Advantageous Effects

In an emergency brake device of the present inventive concept, once the device operates, contact between an outer surface of a guide rail and a braking blade is not released even when a falling load of a door panel is very large. On the contrary, as the falling load becomes greater, the braking blade more strongly cuts into the outer surface of the guide rail, thereby increasing frictional resistance and increasing a braking effect.

Further, the emergency brake device of the present inventive concept automatically operates in response to a door falling at a specified speed or higher and thus may be widely used regardless of the type of door falling accidents.

In addition, according to the present inventive concept, in the case of an elevator door having a relatively small door load, a door that accelerates and falls can be stopped only by a frictional force between a pressing roller and a guide rail without using a braking blade. Thus, the device can be simplified, and damage to the guide rail by the braking blade can be prevented.

MODES OF THE INVENTION

Figure 1:
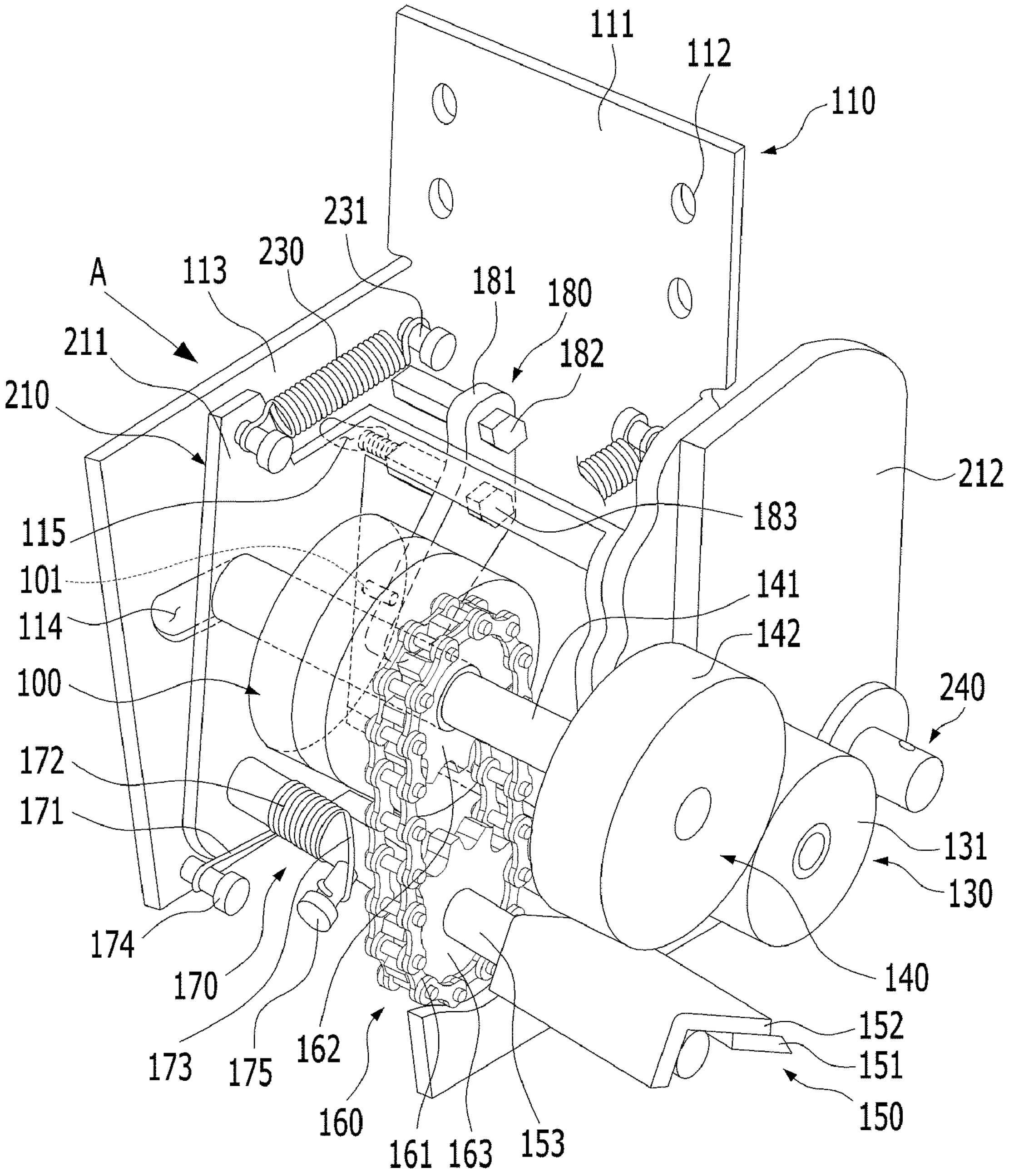
FIG. 1 is a partially cut-away perspective view illustrating a coupling relationship between main components according to embodiment 1 of the present inventive concept.

Hereinafter, embodiments of an emergency brake device for an elevator door will be described in detail with reference to the accompanying drawings. However, the thickness of lines or the size of components illustrated in the drawings may be exaggerated or reduced for convenience to more clearly understand a configuration of the present inventive concept.

Terms used for describing the present inventive concept are terms defined in consideration of functions in the present inventive concept. However, since these terms may be expressed in other terms according to the intention of a designer or user or the custom, substantial definitions of these terms used in the present inventive concept should be made in consideration of contents described throughout the present specification.

Further, directional terms such as "up", "down", "front", "rear", "left", "right", a "front end", and a "rear end" used in the description of the present inventive concept are defined based on the orientation of the disclosed drawings. However, since components of embodiments of the present inventive concept may be positioned in various orientations, the directional terms are used for purposes of illustration and not limitation.

It should be understood that a case in which it is described that components used in the present inventive concept are "connected", "coupled", or "fastened" to each other may also include a case in which indirect connection, coupling, or fastening through an intermediate component is performed.

Further, in the description of the present inventive concept, detailed description of well-known functions and configurations, which may make the subject matter of the present inventive concept unclear, will be omitted.

Embodiment 1

A main component of an emergency brake device according to embodiment 1 of the present inventive concept will be described with reference to FIGS. 1 to 3.

Figure 2:
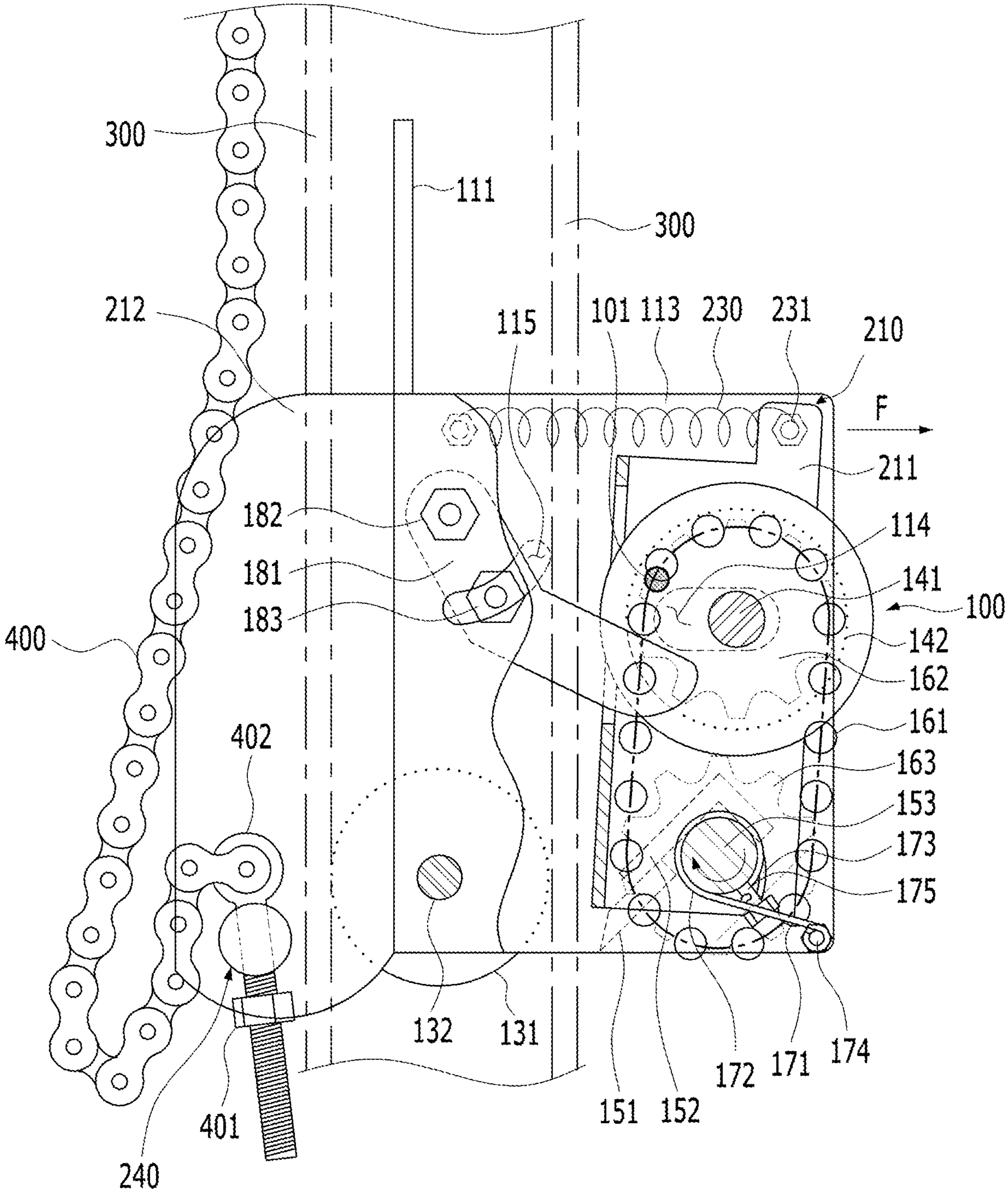
FIGS. 2 and 3 are conceptual views of an installation process of embodiment 1 when viewed from direction A of FIG. 1.
Figure 3:
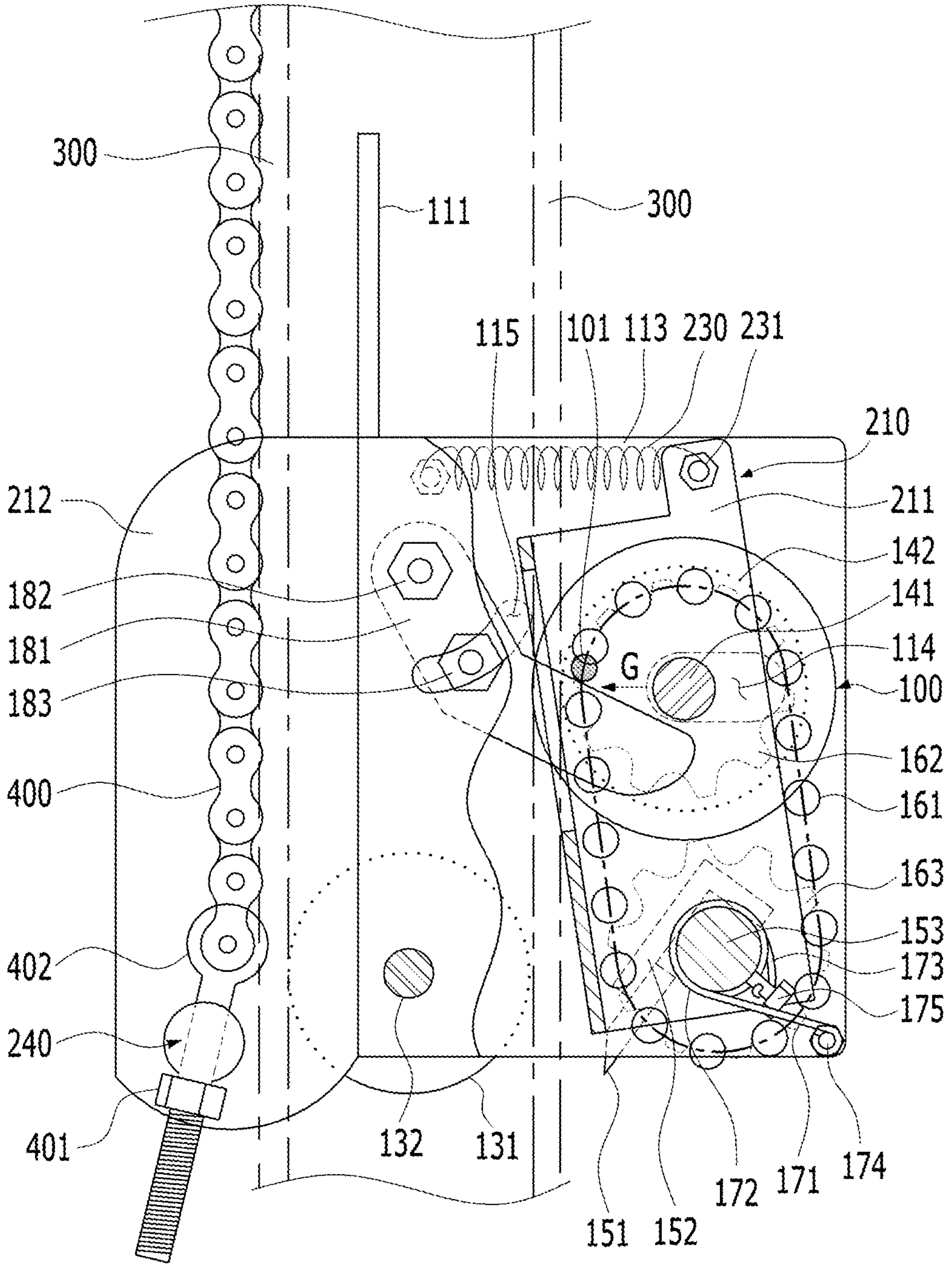

FIG. 1 illustrates a coupling relationship between main components of the emergency brake device according to embodiment 1 of the present inventive concept, and FIGS. 2 and 3 illustrate concepts for an installation process according to embodiment 1 when viewed from direction A of FIG. 1.

The emergency brake device according to the present inventive concept basically performs a conventional elevation guide function.

Further, the emergency brake device according to embodiment 1 of the present inventive concept includes components such as a fixing bracket 110 fixed to both ends of a lower portion of the elevator door, an acceleration prevention device 100 installed inside a front side of the fixing bracket 110, a timing adjustment tool 180 that adjusts an operating time point of the acceleration prevention device, a braking blade movable tool 150 provided with a braking blade 151, a braking force transmission tool 160 that transmits a braking force between the acceleration prevention device 100 and the braking blade movable tool 150, a guide roller part 130, and a movable bracket 210.

The fixing bracket 110 includes a base plate 111 and an outer side plate 113.

Figure 12:
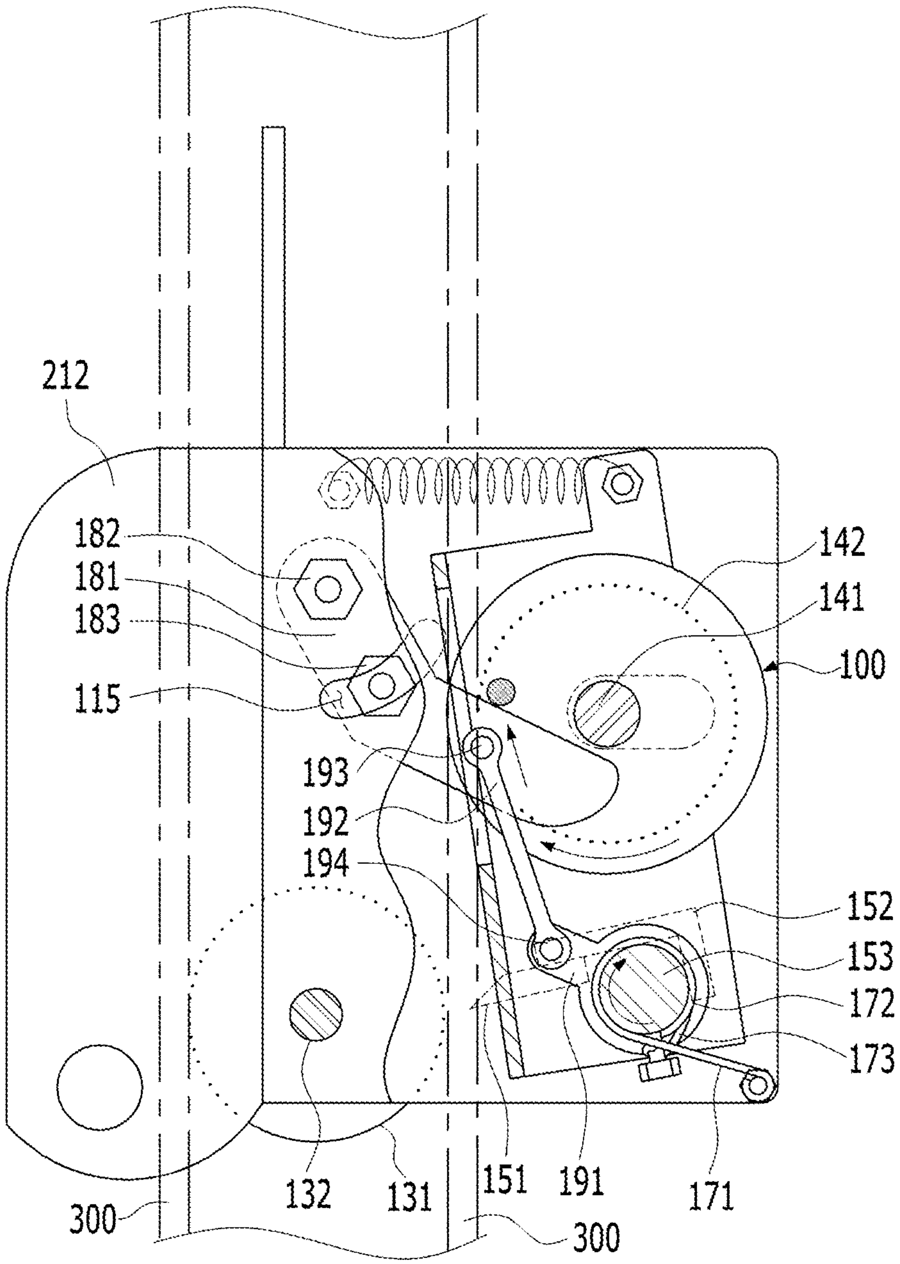
FIG. 12 is a view of an operation state when the elevator door accelerates and falls in embodiment 3 when viewed from direction A of FIG. 10.
Figure 13:
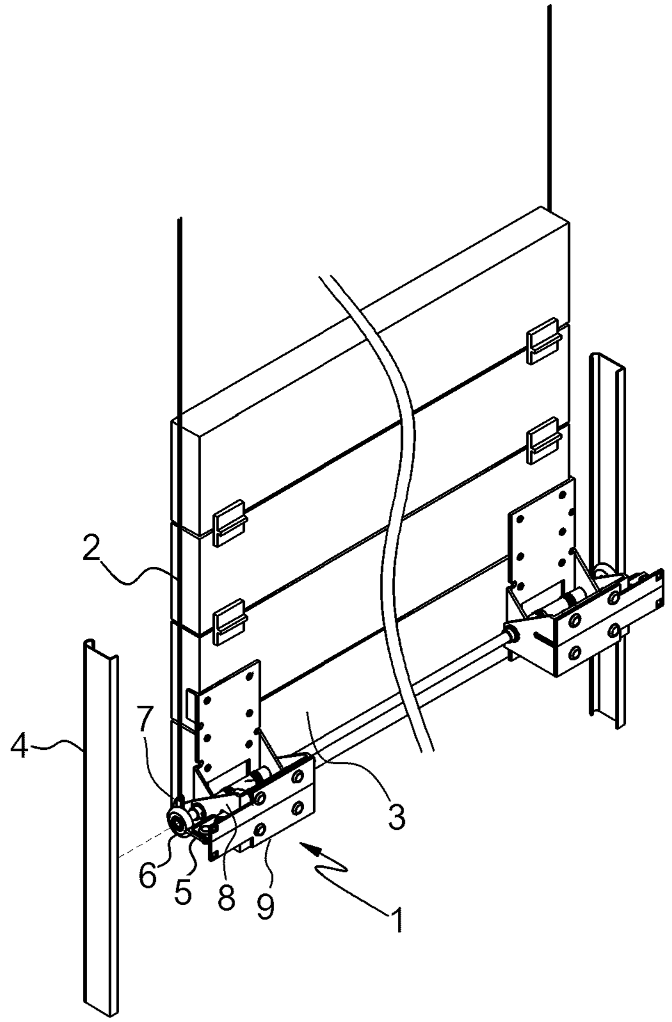
FIG. 13 is an exemplary view of an overhead door in which a conventional emergency brake device is installed.
Figure 14:
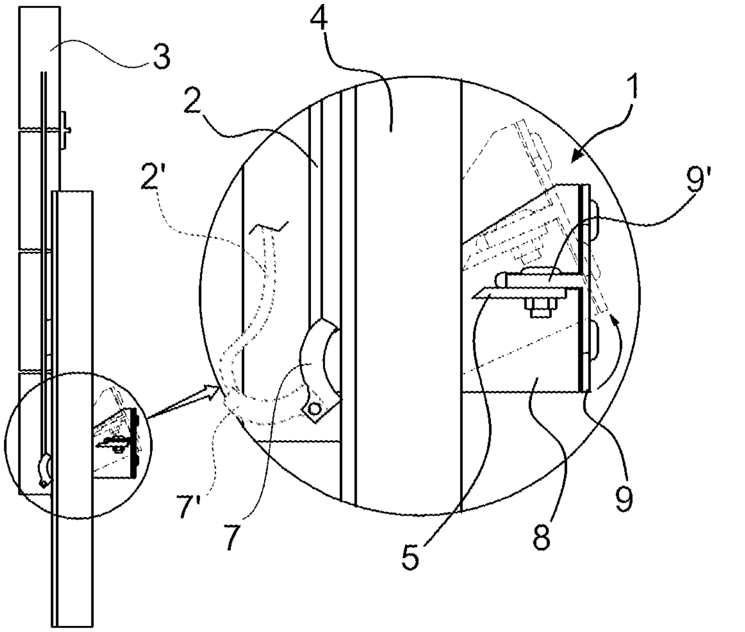
FIGS. 14 and 15 are explanatory views of an operation relationship of the conventional emergency brake device.
Figure 15:
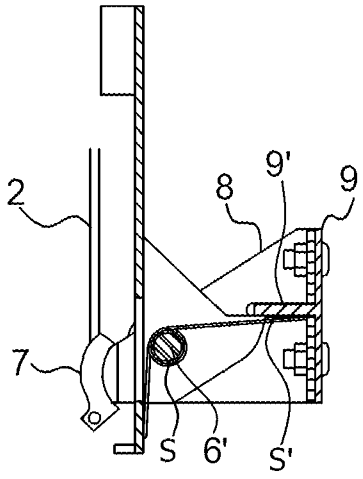

The base plate 111 illustrated in FIG. 1 is coupled to both ends of a lower portion of the elevator door (which can be easily understood with reference to the related art illustrated in FIG. 12). To this end, a plurality of fastening holes 112 into which fixing pieces or bolts may be inserted are formed in the base plate 111.

The outer side plate 113 is provided as a pair of outer side plates 113 which protrude forward from both side surfaces of the base plate 111.

Among the pair of outer side plates 113, the outer side plate 113 far from a guide rail 300, that is, the outer side plate 113 positioned on a left side in FIG. 1 has a first slot 115 and a second slot 114, and the outer side plate 113 (cut and omitted in FIG. 1) positioned on a right side has the second slot 114.

Further, a braking shaft hole through which a braking shaft 153 which will be described below is rotatably installed is formed at a lower end.

An adjustment bolt 183, which will be described below, is coupled to the first slot 115, and a pressing roller shaft 141, which will be described, is installed through the pair of second slots 114.

Referring to FIGS. 1 to 3, the first slot 115 is a soft arc-shaped long hole bent upward while facing from a rear side toward a front side, the second slot 114 is formed as a horizontal or slightly convex long hole from the rear side toward the front side, and the long slots may have different shapes as long as the shapes do not interfere with positional movement of components inserted into the long slots.

That is, it is important that the first slot 115 has a shape that does not interfere with a positional movement path of the adjustment bolt 183, and the second slot 114 has a shape that does not interfere with a positional movement path of the pressing roller shaft 141.

Meanwhile, in FIG. 1, the adjustment bolt 183 is installed in the left outer side plate, but the first slot 115 may be formed in the outer side plate positioned on the right side so that the adjustment bolt 183 is coupled thereto.

The acceleration prevention device 100 has a cylindrical device installed inside the fixing bracket 110 and operates to generate a braking force when a door lowering speed of the elevator door increases to a specified speed or higher. A detailed configuration and operation principle will be described below.

Referring to FIG. 1, the acceleration prevention device 100 has the pressing roller shaft 141 passing through a center thereof, and the pressing roller shaft 141 is fitted in and coupled to the second slot 114. In this case, the pressing roller shaft 141 is mounted to be movable forward and rearward in a lengthwise direction of the slot.

A protrusion 101 is formed on one side surface of the acceleration prevention device 100, and a function of the protrusion 101 will be described below.

The braking blade movable tool 150 includes the rod-shaped braking shaft 153, a braking blade mounting piece 152 fixedly coupled to one end of the braking shaft 153 in a manner such as welding, the chisel-shaped braking blade 151 coupled to the braking blade mounting piece, and an elastic body 170 coupled to and installed in the braking shaft 153.

The braking shaft 153 is fitted in and coupled to the braking shaft hole of the outer side plate 113 but should be coupled so that the braking shaft 153 may rotate in this shaft hole. In this case, the braking blade 151 coupled to one side of the braking shaft 153 is positioned to face the guide rail 300.

The elastic body 170 uses a torsion spring having a coil spring body 172 and spring tails 171 and 173 extending from both ends thereof. Of course, the elastic body 170 may be replaced with a leaf spring or other elastic bodies having a similar shape and function.

The elastic body 170 is installed so that the spring body 172 surrounds the braking shaft 153 and is installed by hanging the one protruding spring tail 171 on a hanger 174 installed inside the outer side plate 113 and hanging the opposite spring tail 173 on a hanger 175 installed on the braking shaft 153.

In this case, when viewed in the drawing of FIG. 1, the installed elastic body is installed so that an elastic force for pulling up the hanger 175 is applied thereto, and thus a clockwise rotational force is always applied to the braking shaft 151, a driven sprocket 13, and the braking blade 151. This refers to a state in which a counterclockwise rotational force is applied to the braking blade 151 when viewed in FIG. 3.

Further, when viewed in the drawing of FIG. 1, as described above, the clockwise rotational force applied to the driven sprocket 13 is transmitted to a driving sprocket 162 and the acceleration prevention device 100 by a connection chain 161 to rotate the driving sprocket 162 and the acceleration prevention device 100 clockwise. In this case, the protrusion 101 formed on an outer surface of the acceleration prevention device 100 is caught by the timing adjustment tool 180, and thus the rotation is stopped.

The braking force transmission tool 160 includes the driving sprocket 162 installed in the pressing roller shaft 141 passing through the acceleration prevention device 100, the driven sprocket 163 installed in the braking shaft 153, and a connection chain 161 connecting the driving sprocket 162 and the driven sprocket 163.

In this case, the driving sprocket 162 installed in the pressing roller shaft 141 is fixed to a second side plate 50 coupled to an outer body 40 of the acceleration prevention device 100 and is thus installed to rotate while interlocked with rotation of the outer body.

Thus, when the outer body of the acceleration prevention device 100 rotates, the driving sprocket also rotates, and the driven sprocket 163 connected through the connection chain 161 also rotates. As a result, the braking shaft 153 in which the driven sprocket 163 is installed rotates so that the braking blade 151 faces the guide rail 300.

A pressing roller part 140 includes the pressing roller shaft 141 and a pressing roller 142.

The pressing roller 142 may be fixedly coupled to one end of the pressing roller shaft 141 and may be positioned to face the guide rail 300. The pressing roller 142 may have a surface made of a material that generates a large frictional force so that the pressing roller 142 is in contact with the guide rail 300 to rotate by friction therebetween.

Due to this configuration, when the pressing roller 142 rotates, the pressing roller shaft 141 which is fixedly coupled also rotates, and the acceleration prevention device 100 installed in the pressing roller shaft 141 operates while interlocked with the pressing roller shaft 141.

The guide roller part 130 includes a rod-shaped roller shaft 132 and a guide roller 131 coupled to one end of the roller shaft 132.

The roller shaft 132 is fitted in and coupled to a roller shaft hole formed in the outer side plate 113.

In this case, the guide roller 1331 should vertically move inside the guide rail 300, and thus the guide roller 131 may be installed to rotate for smooth movement.

Accordingly, the roller shaft 132 is rotatably coupled to the roller shaft hole or a bearing (not illustrated) is installed in an inner circumference surface of the guide roller 131. Further, the roller shaft 132 is fitted and thus only the guide roller 131 is coupled to rotate on the roller shaft 132.

The movable bracket 210 is a "U" shaped frame having inner side plates 211 extending forward from both sides thereof and is coupled to an inside of the fixing bracket 110 to be able to swing forward or rearward.

That is, as illustrated in FIG. 1, the inner side plates 211 on both sides of the movable bracket 210 are arranged in parallel to the outer side plates 113, and thus the movable bracket 210 is coupled to the inside of the fixing bracket 110.

A braking shaft hole (no reference numeral) is formed in the inner side plate 211 at a position corresponding to the same braking shaft hole (no reference numeral) formed in the outer side plate 113, and thus the braking shaft 153 is installed to pass through both the braking shaft holes. In this case, the braking shaft 153 should be freely rotatably installed in the braking shaft hole.

Further, a pressing roller shaft through-hole (no reference numeral) is formed in the inner side plate 211 at a position corresponding to the second slot 114 formed in the outer side plate 113, and thus the pressing roller shaft 141 passes through both the inner side plate 211 and the outer side plate 113.

In this case, the pressing roller shaft through-hole of the inner side plate 211 is formed in the same shape as a cross-sectional shape of the pressing roller shaft 141 not a slot shape and the pressing roller shaft 141 is installed to rotate in place when the pressing roller shaft 141 is fitted therein.

With this configuration, when the movable bracket 210 swings forward or rearward, the guide roller shaft 141 may move the second slot 114 of the outer side plate 113 forward or rearward in a length range.

Further, hangers 231 are installed on an inner upper portion of the inner side plate 211 and an inner upper portion of the outer side plate 113, and a pressing elastic body 230 connecting them is installed. In the present embodiment, the pressing elastic body 230 is configured as a coil spring.

The installed pressing elastic body 230 is in a state in which an elastic force for pulling an upper portion of the inner side plate 211 toward the base plate 111 is applied to the pressing elastic body 230.

Since the movable bracket 210 may rotate about the braking shaft 153 by the above installation structure, the movable bracket 210 may swing forward or rearward by an operation of applying or releasing a tensile force to or from the pressing elastic body 230.

Further, the timing adjustment tool 180 for limiting the rotation of the acceleration prevention device 100 is installed in the fixing bracket 110.

The timing adjustment tool 180 according to embodiment 1 includes an adjustment piece 181 formed of a long metal piece of which a middle portion is bent at a predetermined angle, a fixing bolt 182 for fixing a position of an upper end of the adjustment piece 181, and an adjustment bolt 183 for adjusting a position of a lower end of the adjustment piece.

Referring to FIGS. 1 to 3, the fixing bolt 182 passes through the upper end of the adjustment piece 181 and is then fastened to the outer side plate 113 of the fixing bracket, and the adjustment bolt 183 passes through a middle portion of the adjustment piece 181 and is then fitted in and fastened to the first slot 115 formed in the outer side plate 113. In this case, a spacing tool is fitted in a shaft portion of the fixing bolt 182 and a shaft portion of the adjustment bolt 183 between the outer side plate 113 and the adjustment piece 181, and thus a distance between the outer side plate 113 and the adjustment piece 181 may be maintained as constant.

Here, when the adjustment bolt 183 is slightly loosened, the lower end of the adjustment piece 181 may rotate forward or rearward about the fixing bolt 182. In other words, when the adjustment bolt 183 is loosened and moves along an arc of the first slot 115, a lower portion of the adjustment piece 181 coupled to the adjustment bolt 183 may rotate about the fixing bolt 182 along the arc shape.

Thus, when the adjustment bolt 183 moves to an appropriate position of the first slot 115 and is then tightened and fastened again, a position of the lower end of the adjustment piece 181 is adjusted.

The timing adjustment tool 180 serves to adjust a position of a stop groove 41 formed in an inner circumferential surface of the outer body 40 of the acceleration prevention device 100 illustrated in FIGS. 4 to 7. Further, the timing adjustment tool 180 prevents the entire body of the acceleration prevention device 100 from rotating counterclockwise together with the pressing roller shaft 141 when the pressing roller shaft 141 rotates counterclockwise.

To this end, as illustrated in FIGS. 1 to 3, the protrusion 101 is formed on the outer surface of the acceleration prevention device 100. Further, the position of the adjustment piece 181 is adjusted using the adjustment bolt 183 of the timing adjustment tool 180 so that the adjustment piece 181 supports the protrusion 101 from below.

Figure 7:
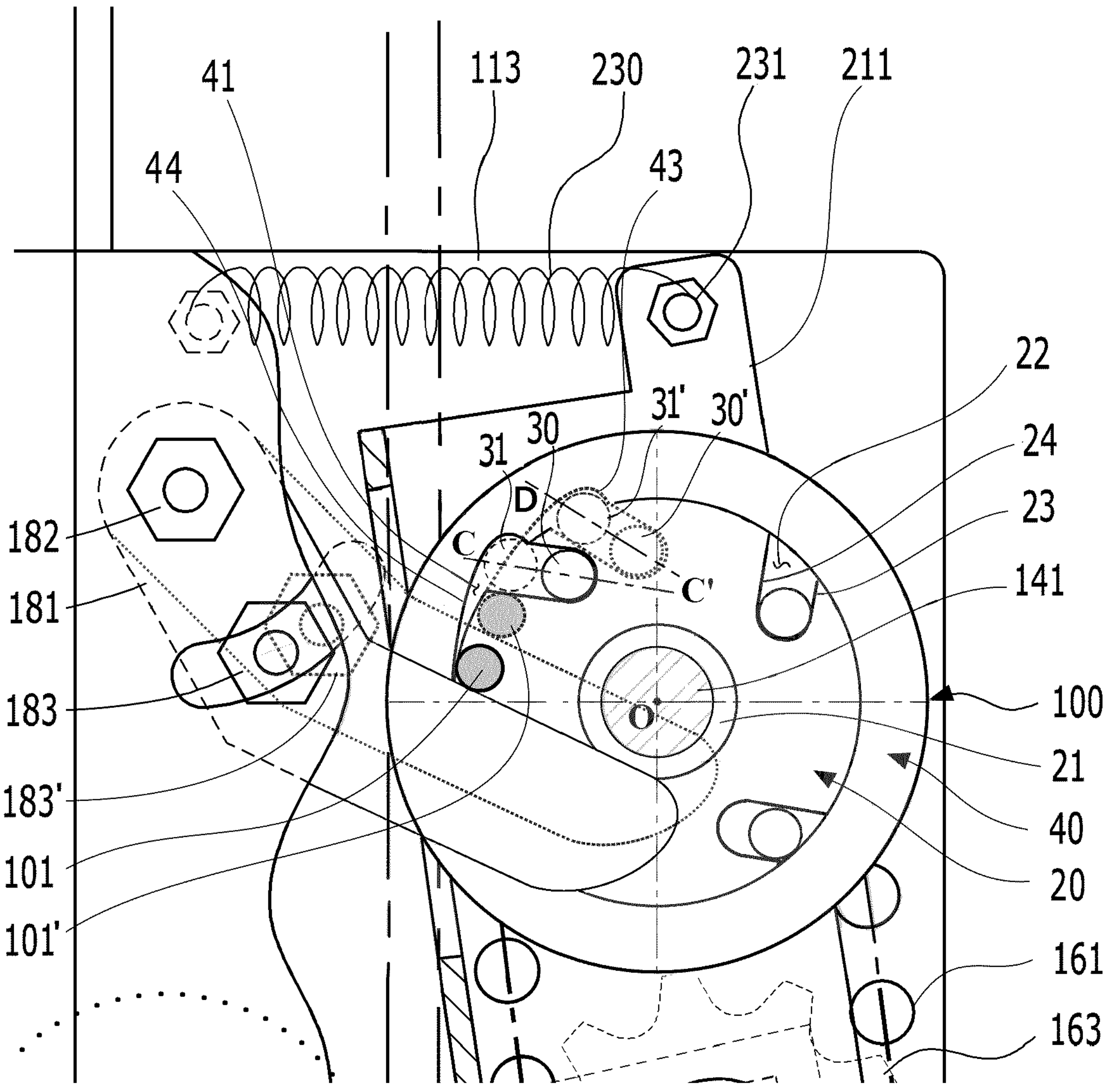
FIG. 7 is an explanatory view of setting of the acceleration prevention device of the emergency brake device according to the present inventive concept.

Here, referring to FIG. 7, when the adjustment bolt 183 is slightly loosened, the lower end of the adjustment piece 181 rotates about the fixing bolt 182 forward or rearward to adjust a position of the adjustment bolt 183, and the adjustment bolt 183 is then fixed, a position at which the protrusion 101 stops by supporting an upper surface of the adjustment piece 181 may be changed and adjusted.

Referring to FIGS. 1 to 3, a rear extension part 212 is a plate installed to extend rearward from the outer side plate 113 on one side of the fixing bracket 110. A connection pin 240 installed to pass through the rear extension part 212 has a pin hole formed therein.

A process of installing the emergency brake device according to embodiment 1 by coupling the emergency brake device to the guide rail 300 will be described with reference to FIGS. 2 and 3.

The emergency brake device according to the present inventive concept is attached to both left and right sides of a door panel at a lower end of the elevator door using the base plate 111 (attached in the same manner as the related art of FIG. 12).

Further, when the movable bracket 210 of FIG. 2 is pulled forward (in a direction of arrow F), the pressing elastic body 230 hanging on the hanger 231 of the inner side plate 211 is tensioned, and the movable bracket 210 rotates about the braking shaft 153 clockwise.

Accordingly, the guide roller shaft 141 coupled to the inner side plate 211 pulls the second slot 114 of the outer side plate 113 in direction F within a length range, and a gap in which the guide rail 300 may be fitted is generated between the pressing roller 142 and the guide roller 131.

In this state, when the guide roller 131 is inserted into a groove of the guide rail 300 and coupled to the guide rail 300, and the movable bracket 210 pulled forward is released, as illustrated in FIG. 3, as the pressing elastic body 230 is elastically restored, the movable bracket 210 rotates inward about the braking shaft 153.

Accordingly, the guide roller shaft 141 moves inward, that is, in direction G, along the second slot of the outer side plate 113, and as a result, the pressing roller 142 stops while coming into contact with an outer surface of the guide rail 300.

In this case, the protrusion 101 formed on the outer surface of the acceleration prevention device 100 is installed such that the protrusion 101 is positioned on an upper surface of the timing adjustment tool 180. As described above, since a clockwise rotational force is applied to the acceleration prevention device 100 by the elastic body 170, the protrusion 101 strongly comes into contact with the upper surface of the timing adjustment tool 180, and the acceleration prevention device 100 is set at a predetermined position.

As described above, when the guide rail 300 and the emergency brake device according to the present inventive concept are coupled, a hoist chain 400 is connected using a connection pin 240 installed to pass through the rear extension part 212.

That is, when an eyebolt 402 coupled to a lower end of the hoist chain 400 is fitted in the pin hole of the connection pin 240 and a nut 401 is fastened and coupled to the eyebolt 402, the hoist chain 400 is connected to the emergency brake device.

As illustrated in FIG. 3, when a hoist force applied to the hoist chain 400 is transmitted to the fixing bracket 110, the emergency brake device of the present inventive concept and the door coupled thereto elevate along the guide rail 300.

In this case, since the elastic force of the pressing elastic body 230 strongly pulls the movable bracket 210, the pressing roller 142 connected to the movable bracket rotates while in contact with the outer surface of the guide rail 300, and the rotation is transmitted to the interlocked acceleration prevention device 100 through the pressing roller shaft 141.

Next, a configuration of the acceleration prevention device 100 and an operational relationship of embodiment 1 will be described with reference to FIGS. 4 to 7.

Figure 4:
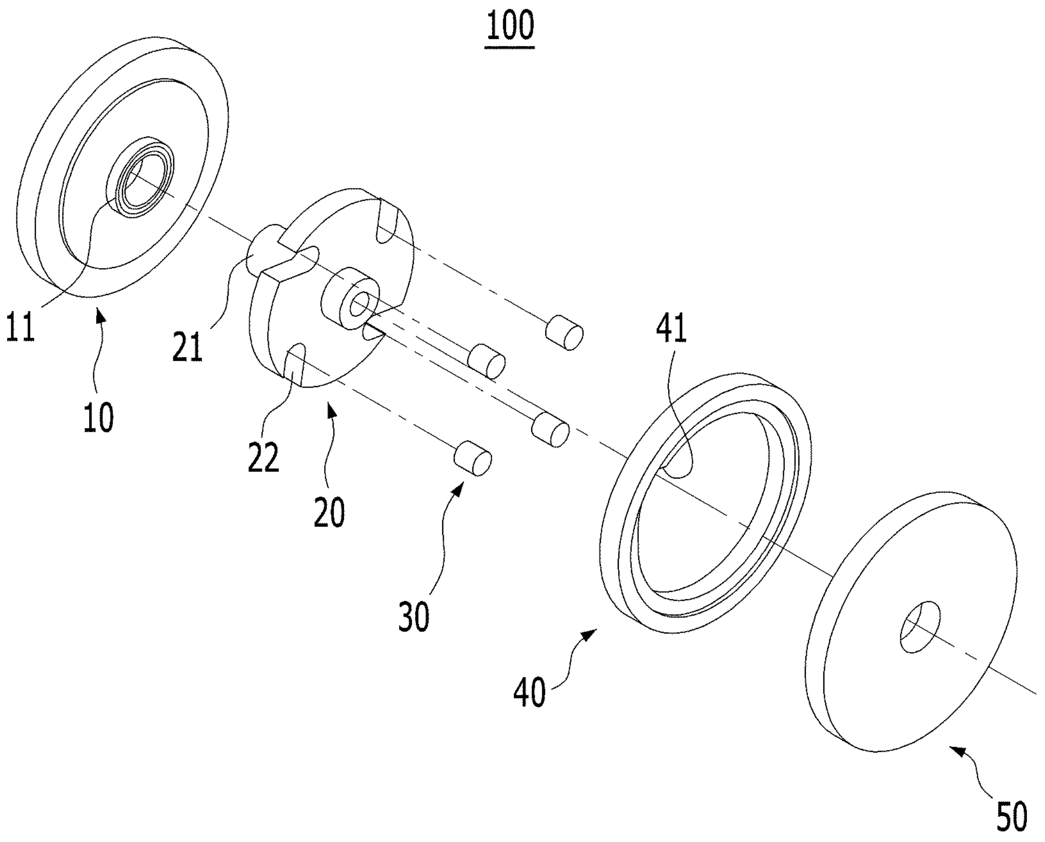
FIG. 4 is an exploded perspective view of an acceleration prevention device of an emergency brake device according to the present inventive concept.
Figure 5:
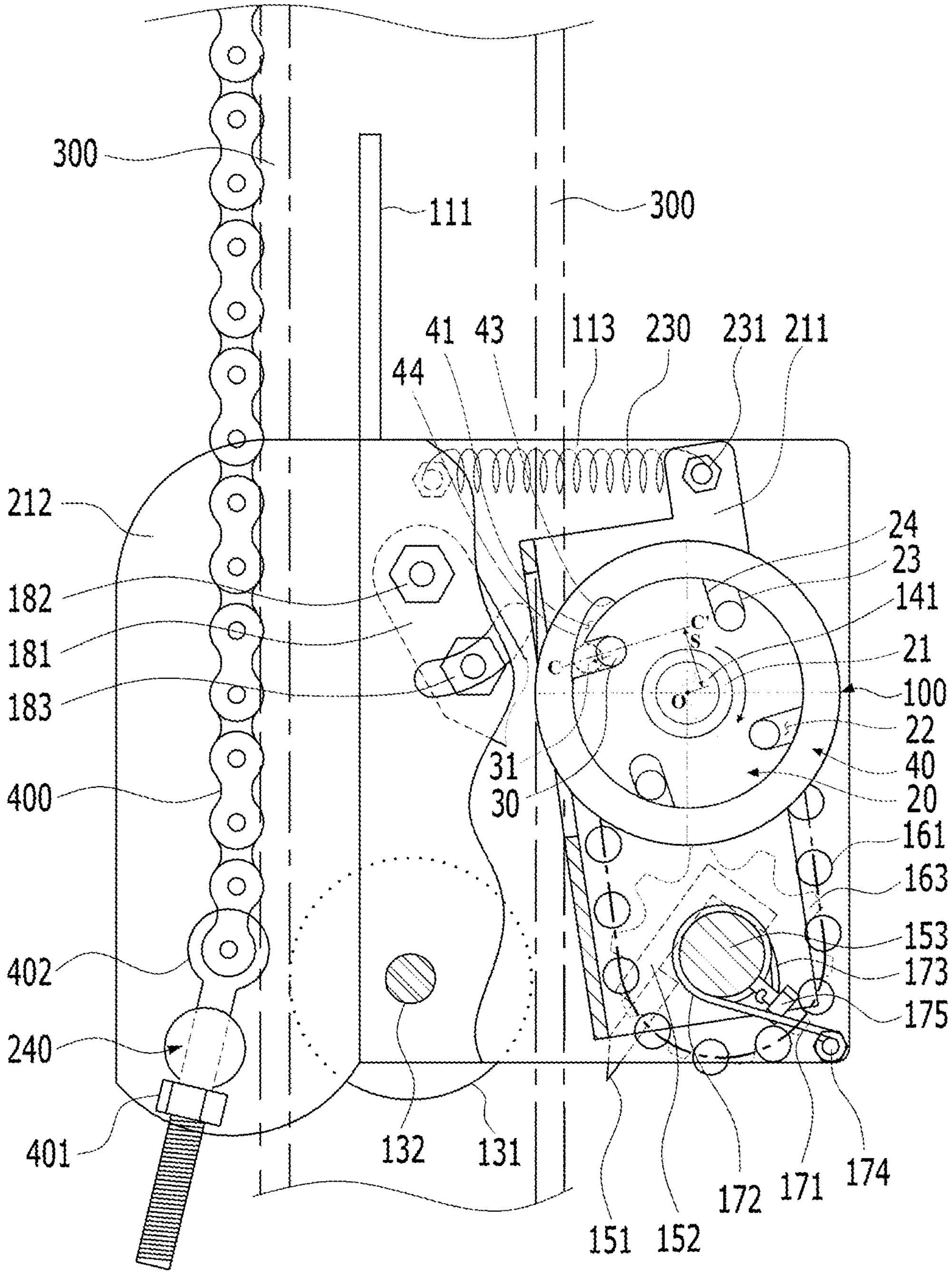
FIG. 5 is a view of an operation state of embodiment 1 when an elevator door normally operates, when viewed from direction A of FIG. 1.
Figure 6:
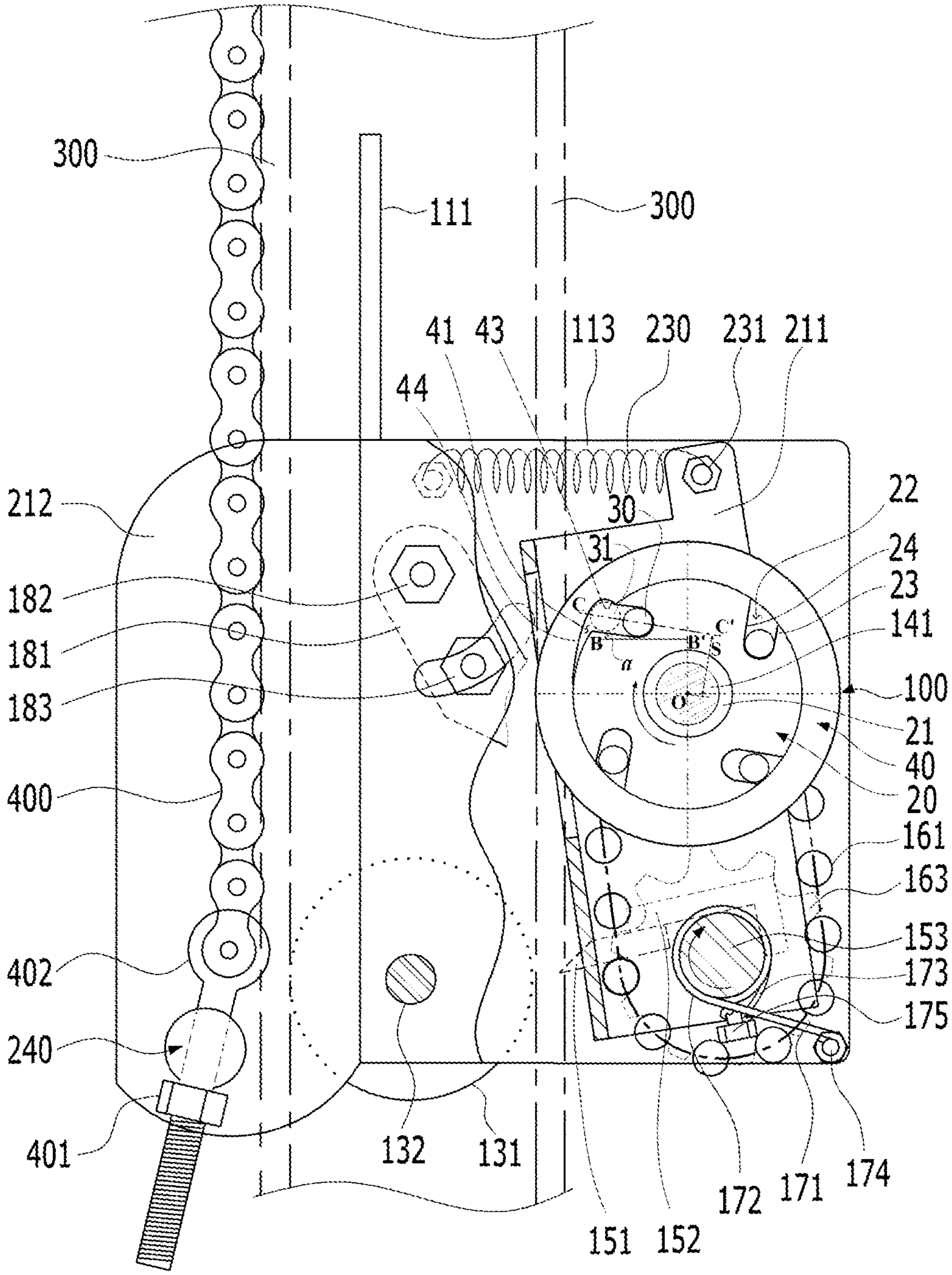
FIG. 6 is a view of the operation state of embodiment 1 when an elevator door accelerates and falls, when viewed from direction A of FIG. 1.

FIG. 4 is an exploded perspective view of an acceleration prevention device used in the present inventive concept, and FIG. 5 is a view of an operation of the acceleration prevention device in a state before the emergency brake device according to the present inventive concept operates, that is, in a state in which the door normally operates within a specified speed, when viewed from direction A of FIG. 1. FIG. 6 is a view of the operation of the acceleration prevention device in a state in which the door accelerates and lowers and thus the emergency brake device according to the present inventive concept operates, when viewed from direction A of FIG. 1. FIG. 7 is a diagram for describing a method of setting the acceleration prevention device according to the present inventive concept so that the acceleration prevention device operates at a specific door falling speed.

Referring to FIG. 4, the acceleration prevention device 100 according to the present inventive concept includes a rotating body 20, an outer body 40, a moving body 30, and first and second side plates 10 and 50.

First, the rotating body 20 has a shape of a disc, and an accommodation groove 22 recessed toward an inside of the disc is formed in an outer circumferential surface of the disc. The rotating body may be made of a metal having good rigidity. A central shaft 21 may be installed by fitting and coupling a separate shaft in and to a center of the disc or may be formed integrally with the disc. Further, the center shaft 21 is formed as a hollow shaft.

The accommodation groove 22 is formed as a well-shaped deep groove and has a depth in which the moving body 30 may be completely inserted. A width of the accommodation groove 22 is slightly greater than a diameter of the moving body so as not to interfere with a rolling movement of the moving body 30 thereinside.

The accommodation groove 22 may be provided as two or more accommodation grooves 22, and the plurality of accommodation grooves 22 may be arranged at equal intervals.

Even when the one accommodation groove 22 is installed or the plurality of accommodation grooves 22 are not arranged at equal intervals, the emergency brake device may operate. However, vibration may occur during rotation due to an eccentricity occurring in the shape of the disc constituting the rotating body 20.

Referring to FIGS. 5 and 6, in the acceleration prevention device of the present inventive concept, an axial line C-C' extending from a central axis of the accommodation groove 22 does not pass through a center O of the center shaft 21 and is spaced a vertical distance S from the center O, and thus the inclined accommodation groove 22 is formed. Thus, a length of a lower surface 24 of the accommodation groove 22 is formed to be greater than a length of an upper surface 23 thereof.

When the axial line C-C' extending from the central axis of the accommodation groove 22 passes through the center O of the central shaft 21, that is, when the upper surface 23 and the lower surface 24 of the accommodation groove have the same length form a vertical groove toward the center, a centrifugal force with which a moving body 31 escapes from the accommodation groove 22 should be greater than that of the inclined accommodation groove 22.

Thus, when the accommodation groove that is the vertical groove is formed, this state is suitable for use when the acceleration prevention device rotates at a high speed, and as in the prevent invention, when the door elevates at a low speed and the acceleration prevention device also rotates at a low speed, the generated centrifugal force is small, and accordingly, the inclined accommodation groove 22 may be formed.

Referring to FIG. 4, the outer body 40 is formed in a ring shape surrounding the outer circumferential surface of the rotating body 20. In this case, an outer circumference of the ring shape does not necessarily have a circular shape and may also have a polygonal shape.

The outer body 40 accommodates the rotating body 20 in the ring-shaped inner empty space in a rotatable state. Further, the stop groove 41 recessed toward the outside is formed in the inner circumferential surface of the outer body 40, that is, a ring-shaped inner circumferential surface.

As illustrated in FIGS. 5 and 6, the stop groove 41 is formed with a guide surface 44 deepened at a gentle slope, an end of the guide surface 44 raises steeply to form a stopping step 43, and thus the stop groove 41 is formed in a shape similar to curve of a sickle blade as a whole.

A maximum depth of the stop groove 41 and a depth at which the moving body 30 is maximally inserted are formed so as not to be greater than a diameter of the moving body 30 and may be matched with the radius of the moving body 30. This is because, when an acceleration prevention function operates, a shear resistance to a compressive force that the moving body 30 introduced into the stop groove 41 receives by being fitted between the stopping step 43 and the lower surface 24 of the accommodation groove 22 is biggest.

The moving body 30 is inserted into the accommodation groove 22 of the rotating body 20 and is installed to move forward or rearward between an inside and an outside of the accommodation groove 22.

In FIG. 4, the moving body 30 is illustrated as a roller but may be replaced with a ball or the like. That is, the moving body 30 may have any shape as long as the moving body 30 may move forward or rearward between the inside and the outside of the accommodation groove 22.

The first and second side plates 10 and 50 are covers coupled to both surfaces of the outer body 40 and the rotating body 20 and prevent the moving body 30 from being separated.

A hole through which the center shaft 21 passes is formed in the center of the first and second side plates 10 and 50, and a bearing 11 may be installed in this hole to support the rotating center shaft 21.

An operation according to embodiment 1 of the present inventive concept using the acceleration prevention device will be described with reference to FIGS. 5 to 7.

When the door raises by rolling up the hoist chain 400, the emergency brake device according to the present inventive concept raises along the guide rail 300, and thus the pressing roller 142 in contact with the outer surface of the guide rail 300 rotates counterclockwise (see FIG. 3).

Thus, the pressing roller shaft 141 and the rotating body 20 fitted in the center shaft 21 of the acceleration prevention device 100 also rotate counterclockwise.

When the rotating body 20 rotates counterclockwise, as can be seen in FIGS. 5 and 6, even when the moving body 30 protrudes outward from the accommodation groove 22, the moving body 30 is not stopped by the stopping step 43, and thus the rotating body 20 normally rotates without limiting a rotational speed.

In this case, a phenomenon in which the outer body 40 rotates along the moving body 30 does not occur because the protrusion 101 formed on an outer surface of the first side plate 10 of the acceleration device 100 is stopped by the adjustment piece 181.

Meanwhile, when the door lowers by loosening the hoist chain 400, the emergency brake device according to the present inventive concept lowers along the guide rail 300, and thus the pressing roller 142 in contact with the outer surface of the guide rail 300 rotates clockwise (see FIG. 3).

In this case, when the door normally lowers within a specified speed, the acceleration prevention device 100 operates as follows.

As illustrated in FIG. 5, when the rotating body 20 rotates clockwise and the accommodation groove 22 moves to an initial entrance of the guide surface 44, the lower surface 24 of the accommodation groove is inclined downward toward the stop groove 41.

Thus, the moving body 30 rolls down along a slope of the lower surface 24 of the accommodation groove and is blocked and stopped by the guide surface 44 of the stop groove 41 like the moving body 31 indicated by a dotted line.

In this state, when the rotating body 20 continuously rotates clockwise, the moving body 31 raises along the guide surface 44.

Next, when the accommodation groove 22 approaches the stopping step 43, as illustrated in FIG. 6, the lower surface 24 of the accommodation groove 22 is inclined downward toward an inside of the rotating body 20 at an inclination of a predetermined angle $\alpha$ with respect to a horizontal axis B-B'.

Thus, the moving body 31 indicated by the dotted line rolls down into the accommodation groove 22 along the lower surface 24 and is accommodated inside the accommodation groove 22, the rotating body 20 continues to rotate without being hindered by the moving body 30, and thus the acceleration prevention device 100 does not operate, and the door normally lowers.

Next, when an accident (for example, falling of the door) in which the lowering of the door is accelerated at a specified speed or more occurs due to reasons such as failure of the motor or cutting of the hoist chain, the acceleration prevention device 100 operates as follows.

When a lowering speed of the door is accelerated, a speed at which the rotating body 20 rotates clockwise also increases. Thus, as illustrated in FIG. 5, the moving body 30 not only rolls down along the lower surface 24 inclined downward toward the stop groove 41 but also is pushed toward the guide surface 44 of the stop groove 32 by a centrifugal force. Further, the moving body 31 pushed to the guide surface 44 raises toward the stopping step 43 while in close contact with the guide surface 44.

Next, when the rotating body 20 continues to accelerate and rotate, as illustrated in FIG. 6, the accommodation groove 22 becomes closer to the stopping step 43. Thus, even when the lower surface 24 is inclined downward toward the inside of the rotating body 20 at an inclination of the predetermined angle $\alpha$, the moving body 31 raising while in close contact with the guide surface 44 by a centrifugal force does not roll into the accommodation groove.

In this state, when the moving body 31 reaches the stopping step 43 of the stop groove 41, the moving body 31 is engaged by being fitted between the stopping step 43 and the lower surface 24 of the accommodation groove 22, and the rotating body 20 rotates clockwise up to the outer body 40.

In this case, the driving sprocket 162 installed in the pressing roller shaft 141 rotates while interlocked with the outer body 40 of the acceleration prevention device 100, and thus the driven sprocket 163 connected to the driving sprocket through the connection chain 161 also rotates clockwise.

As a result, as illustrated in FIG. 6, the braking shaft 153 in which the driven sprocket 163 is installed also rotates clockwise, the braking blade 151 comes into contact with the surface of the guide rail 300 as if the braking blade 151 strikes the surface of the guide rail 300, and thus the falling elevator door is stopped with a strong frictional force.

In this stopped state, the rotating body 20 of the acceleration prevention device interlocked with the braking shaft in which the braking blade 151 is installed and the pressing roller 142 interlocked with the rotating body 20 are also stopped. In this case, since the pressing roller 142 is strongly in contact with the surface of the guide rail 300 by the pressing elastic body 230, a braking effect due to this frictional force is additionally generated.

Next, a method of setting the lowering speed of the door operated by the emergency brake device according to the present inventive concept will be described with reference to FIG. 7.

As described above, a stop position of the protrusion 101 formed on the outer surface of the emergency brake device 100 may be adjusted using the adjustment piece 181.

As illustrated in FIG. 7, in order to raise the initial adjustment piece 181 to a position indicated by a dotted line, the adjustment bolt 183 is loosened, and the adjustment piece 181 is pushed up and is then tightened again at a position of an adjustment bolt 183' indicated by a dotted line.

When the position of the adjustment piece is adjusted in this way, the protrusion 101 at an initial position is caught and stopped by the adjustment piece 181 at a higher position as a dotted line display protrusion 101'. Accordingly, the outer body 40 of the emergency brake device 100 may be changed and set to a position that slightly rotates clockwise from an initial position.

Thus, the stop groove 41 formed in the inner circumferential surface of the outer body 40 is also set to a position that slightly rotates clockwise and is higher than an initial position as indicated by a dotted line.

When the stop groove 41 raises to a high position, a central axis line of the accommodation groove 22 in which the moving body stopped by the stop groove is accommodated is changed from line C-C' to line D-C. A slope of line D-C' is greater than that of line C-C', and thus the central axis line becomes closer to a vertical state.

The moving body 31 is in a state in which the moving body 31 is stopped by the stopping step 43 of the accommodation groove when the moving body 30 present in the accommodation groove of which the central axis line is line C-C' escapes by a centrifugal force, and the moving body 31' is in a state in which the moving body 31' is stopped by the stopping step 43 of the accommodation groove when the moving body 30' present in the accommodation groove of which the central axis line is line D-C' escapes by a centrifugal force.

However, in the central axis line, an inclination of the line D-C' is closer to the vertical axis than line C-C'. Thus, the centrifugal force with which the moving body escapes from the accommodation groove 22 and is maintained in a stopped state by the stopping step 43 should be more strongly applied to the moving bodies 30 and 31' present in the accommodation groove of which the central axis line is line D-C'.

Thus, as the stop groove 41 raises to a higher position, the moving body may escape from the accommodation groove 22 and be stopped by the stopping step only when a required rotational speed of the rotating body 20 is higher.

Further, the rotational speed of the rotating body 20 is proportional to the falling speed of the door. As a result, in order to operate the emergency brake device when the falling speed of the door is higher, the position of the adjustment piece 181 raises, and thus the protrusion 101 is set to be stopped at a high position. Further, in order to operate the emergency brake device when the falling speed of the door is slightly lower, the position of the adjustment piece 181 lowers, and thus the protrusion 101 is set to be stopped at a low position.

Embodiment 2

A configuration of an emergency brake device according to embodiment 2 of the present inventive concept will be described with reference to FIGS. 8 and 9.

Figure 8:
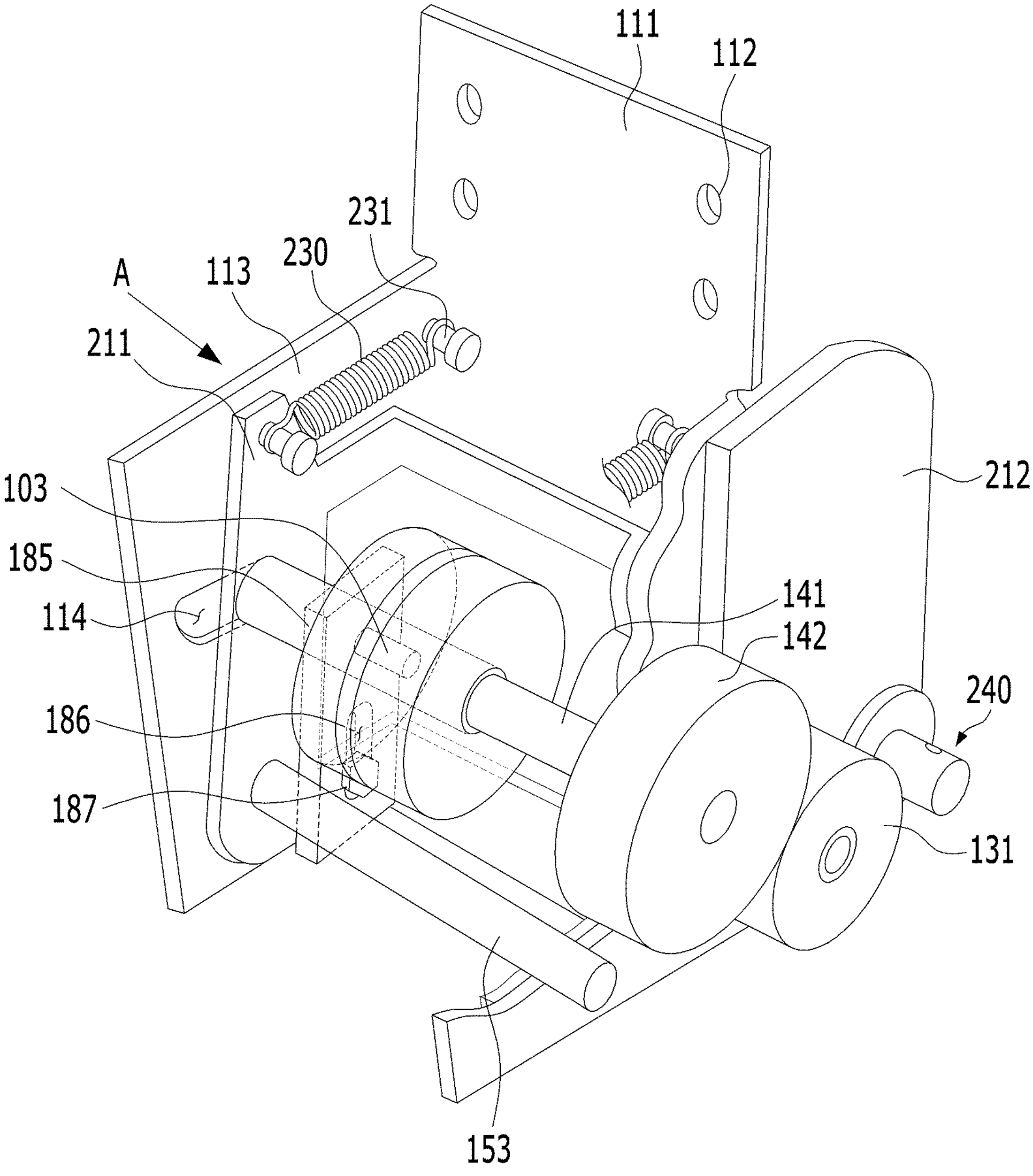
FIG. 8 is a partially cut-away perspective view illustrating a coupling relationship between main components according to embodiment 2 of the present inventive concept.
Figure 9:
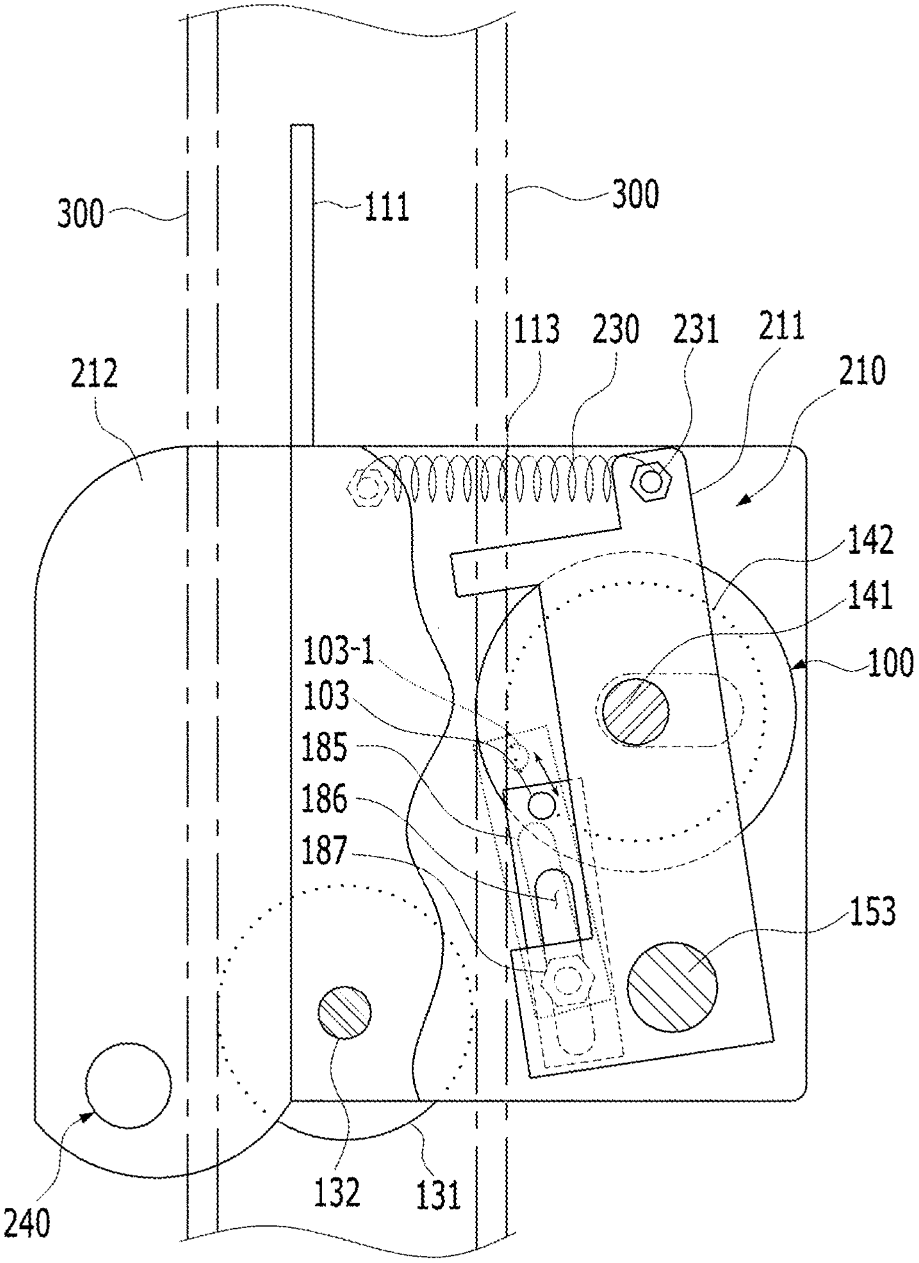
FIG. 9 is an operation state diagram of embodiment 2 when viewed from direction A of FIG. 8.

FIG. 8 illustrates a coupling relationship between main components of the emergency brake device according to embodiment 2 of the present inventive concept, and FIG. 9 illustrates an operation relationship according to embodiment 2 when viewed from direction A of FIG. 8.

The emergency brake device according to embodiment 2 is a device that is a relatively small elevator door and thus may be used when a falling load is not large.

As illustrated in FIG. 8, in the emergency brake device according to embodiment 2 of the present inventive concept, the braking blade 151 and a configuration for operating the braking blade are omitted, and a configuration of the timing adjustment tool is changed.

Thus, the emergency brake device according to embodiment 2 includes the fixing bracket 110 fixedly mounted on both ends of the lower portion of the elevator door, the acceleration prevention device 100 installed inside a front side of the fixing bracket 110, a timing adjustment tool 180-1, the guide roller part 130, and the movable bracket 210.

Since the details of the configurations except for the timing adjustment tool 180-1 among the configurations are almost the same as those according to embodiment 1, a detailed description thereof will be omitted.

However, in embodiment 2, the braking blade 151 is not attached to the braking shaft 153, but like embodiment 1, the braking shaft 153 functions as a rotational center axis for swinging the movable bracket 210 forward or rearward. Further, instead of the protrusion 101 formed on one side surface of the acceleration prevention device 100 according to embodiment 1, an adjustment rod 103 for performing a similar function thereto is installed.

A configuration of the timing adjustment tool 180-1 will be described with reference to FIGS. 8 and 9.

The timing adjustment tool 180-1 according to embodiment 2 includes an adjustment table 185 formed of a long metal piece in the form of a flat rectangular parallelepiped shape, an adjustment bolt 187 that adjusts a vertical position of the adjustment table 185, and a third slot 185 formed vertically long in the adjustment table 185.

Referring to FIGS. 8 and 9, the adjustment table 185 is attached and installed on an inner surface of the one inner side plate 211 of the movable bracket 210.

To this end, a bolt hole (not illustrated) for fixing a lower end of the adjustment table 185 is formed in the inner surface of the inner side plate 211. The bolt hole and the third slot 186 of the adjustment table 185 are matched with each other and are then fixed by fastening the adjustment bolt 187 thereto.

A coupling hole is formed in an upper portion of the adjustment table 185, and the adjustment rod 103 formed on one side surface of the acceleration prevention device 100 is inserted into and coupled to the coupling hole. In this case, the adjustment rod 103 should be in a rotatable state in the coupling hole.

In this way, when the adjustment table 185 is fixed to the inner surface of the inner side plate 211, the adjustment table 185 becomes immovable. Accordingly, the outer body 40 of the acceleration prevention device 100 connected to the adjustment table 185 through the adjustment rod 103 is also fixed, and thus the setting of the acceleration prevention device 100 is performed.

Referring to FIG. 9, in the initially set adjustment table 185 and the acceleration prevention device 100, when the adjustment bolt 187 is slightly loosened, the adjustment table 185 may move vertically. In other words, when the adjustment bolt 183 is slightly loosened and the adjustment table 185 is vertically pulled or pushed, the adjustment bolt 187 relatively moves along a length of the third slot 186.

In more detail, as illustrated in FIG. 8, when the adjustment bolt 187 is slightly loosened and the adjustment table 185 is pulled upward, the outer body 40 of the acceleration prevention device 100 connected through the adjustment rod 103 rotates clockwise, and the adjustment rod 103 raises in an upward and leftward direction. Thus, since a lower end of the adjustment table 185 is also stopped by the adjustment bolt 187, the adjustment table 185 moves in the upward and leftward direction while tilted obliquely. Thereafter, when an adjustment rod 103-1 reaches a predetermined position, the adjustment bolt 187 may be tightened again to fix the adjustment table 185, and accordingly, the setting of the acceleration prevention device 100 is performed.

In this way, like the timing adjustment tool 180 according to embodiment 1, the timing adjustment tool 180-1 according to embodiment 2 may serve to adjust the position of the stop groove 41 of the acceleration prevention device 100 and may prevent the entire body of the acceleration prevention device 100 from rotating counterclockwise together with the pressing roller shaft 141 when the pressing roller shaft 141 rotates counterclockwise.

An operation of embodiment 2 of the present inventive concept will be described with reference to FIG. 9.

When the door raises by rolling up the hoist chain 400, the operation of embodiment 2 is the same as embodiment 1.

That is, when the emergency brake device according to the present inventive concept raises along the guide rail 300, the pressing roller 142 also rotates counterclockwise, and thus the rotating body 20 of the acceleration prevention device 100 also rotates counterclockwise.

As described in embodiment 1, when the rotating body 20 rotates counterclockwise, the rotating body 20 normally rotates without limiting the rotational speed, and thus when the door raises, the emergency brake device according to embodiment 2 of the present inventive concept does not operate.

Meanwhile, when the door lowers by loosening the hoist chain 400, and when the door normally lowers within a specified speed, likewise, the acceleration prevention device 100 operates in the same manner as embodiment 1.

Next, in embodiment 2, when an accident (for example, falling of the door) in which the lowering of the door is accelerated at a specified speed or more occurs due to reasons such as failure of the motor or cutting of the hoist chain, the acceleration prevention device 100 operates as follows.

When the lowering speed of the door is increased, the same operation principle described in embodiment 1 is applied to the acceleration prevention device 100. Thus, a speed at which the rotating body 20 of the acceleration prevention device 100 rotates clockwise increases, and accordingly, a clockwise rotational force is applied to the outer body 40.

In this case, as illustrated in FIG. 8, since the adjustment rod 103 formed on the first side plate 10 integrally coupled with the outer body 40 is fixed to an upper end of the adjustment table 185 together, the rotation of the outer body 40 can be prevented.

Accordingly, as illustrated in FIG. 6, as the moving body 31 is stopped by the stopping step 43 on the inner circumferential surface of the outer body 40, the rotating body 20 is stopped, and the pressing roller 142 connected to the rotating body 20 through the pressing roller shaft 141 is also stopped.

As a result, the movable bracket 210 pushes the pressing roller 142 that does not rotate to a surface of the guide rail 300 by the pulling force of the pressing elastic body 230 as it is. In this case, a large frictional force occurs between the pressing roller 142 and the guide rail 300 so that the pressing roller 142 does not slide on the surface of the guider rail 300.

The frictional force between the pressing roller 142 and the guide rail 300 generated as described above can stop the door that accelerates and falls when a load is relatively small as in the small elevator door.

In this way, the emergency brake device according to embodiment 2 is applied to the elevator door having a relatively small door load, and when the door load is large, the emergency brake device using the braking blade according to embodiment 1 or an emergency brake device according to embodiment 3, which will be described below, may be used.

Embodiment 3

A configuration of the emergency brake device according to embodiment 3 of the present inventive concept will be described with reference to FIGS. 10 and 12.

Figure 10:
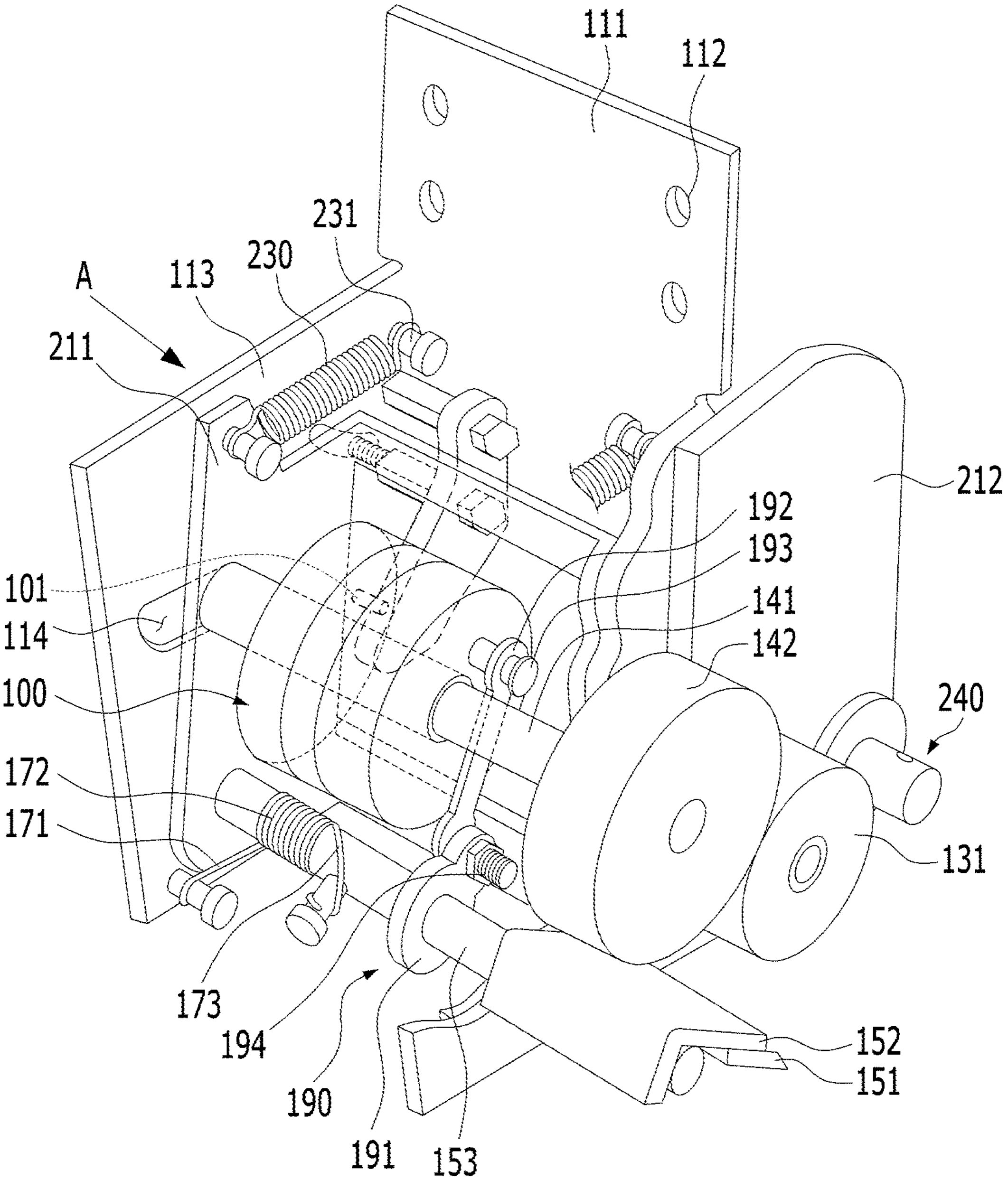
FIG. 10 is a partially cut-away perspective view illustrating a coupling relationship between main components according to embodiment 3 of the present inventive concept.
Figure 11:
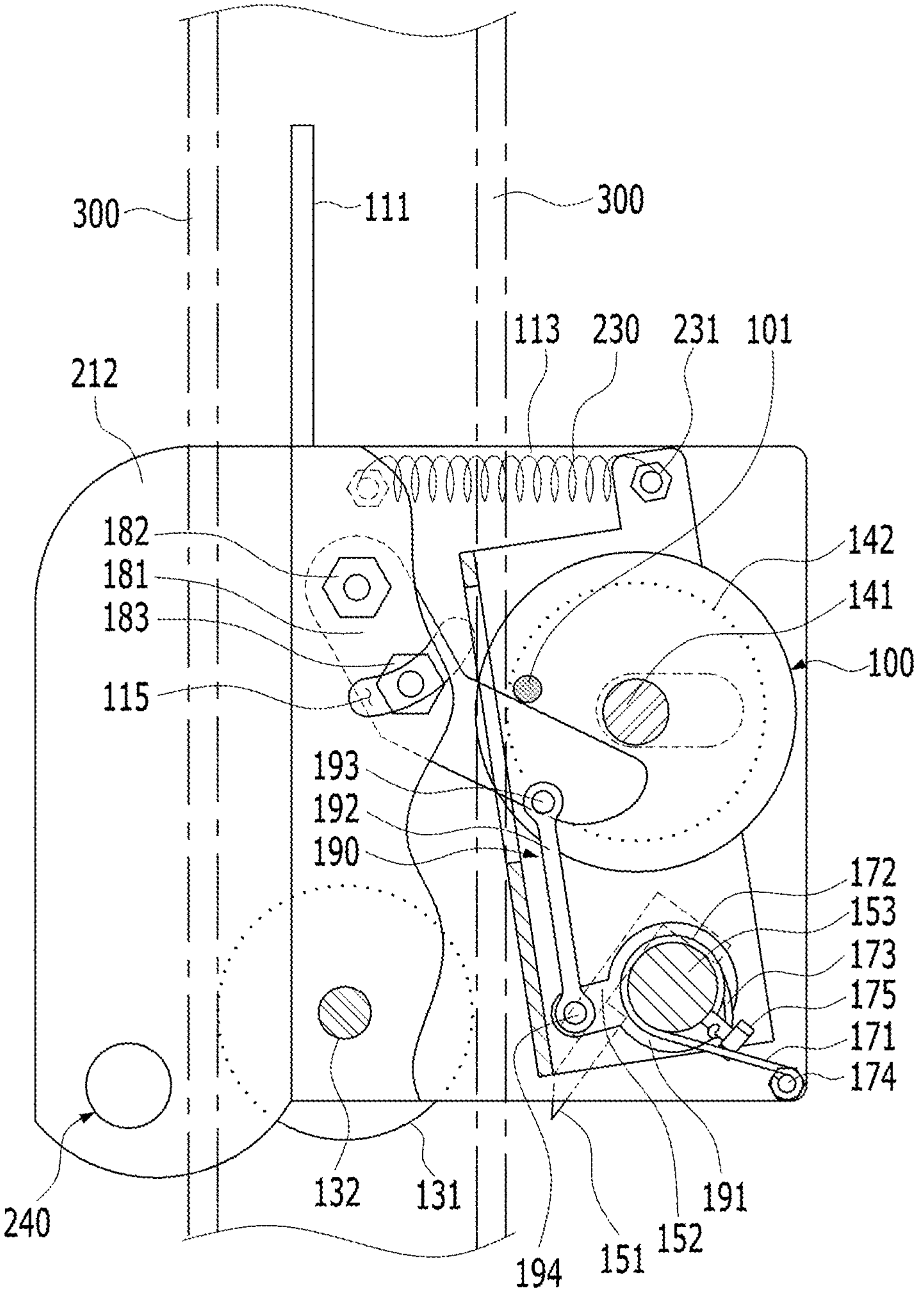
FIG. 11 is a view of an operation state when the elevator door normally operates in embodiment 3 when viewed from direction A of FIG. 10.

FIG. 10 illustrates a coupling relationship between main components of embodiment 3, and FIGS. 11 and 12 illustrate an operational relationship of embodiment 3 when viewed from direction A of FIG. 9.

As illustrated in FIG. 10, embodiment 3 is a form in which a configuration of the braking force transmission tool is changed in embodiment 1, and the other configurations are the same as embodiment 1.

That is, the emergency brake device according to embodiment 3 of the present inventive concept includes components such as the fixing bracket 110 fixed to both ends of the lower portion of the elevator door, the acceleration prevention device 100 installed inside the front side of the fixing bracket 110, the braking blade movable tool 150 provided with the braking blade 151, the braking force transmission tool 190 that transmits a braking force between the acceleration prevention device 100 and the braking blade movable tool 150, the guide roller part 130, and the movable bracket 210.

A detailed configuration of the braking force transmission tool 190 among the above components will be described in detail.

Referring to FIG. 10, the braking force transmission tool 190 simply includes two components including a connection rod 192 and a lower arm 191.

The connection rod 192 is configured in the form of a long rod having coupling holes at both ends. The lower arm 191 is a short metal piece having a coupling hole to be fitted and coupled to the braking shaft 153 and a coupling hole for coupling the connection rod 192 formed at both ends thereof.

An upper connection pin 193 formed in the acceleration prevention device 100 at the second side plate 50 is rotatably fitted in and coupled to the coupling hole formed at one end of the connection rod 192. Further, a lower connection bolt 194 is simultaneously fastened and coupled through the coupling hole formed at the other end of the connection rod 192 together with the coupling hole formed at one end of the lower arm 191. in this case, the connection rod 192 and the lower arm 191 should rotate about the lower connection bolt 194 relative to each other.

The braking shaft 153 is completely fitted in and coupled to the coupling hole formed at the other end of the lower arm 191. That is, the braking shaft 153 is coupled to the lower arm 191 so that the braking shaft 153 and the lower arm 191 do not rotate relative to each other.

Due to the above connection configuration, when the outer body 40 of the acceleration prevention device 100 rotates, a link movement occurs in which the connection rod 192 and the lower arm 191 connected to the connection rod move in a chain manner while interlocked with the rotation.

An operation of embodiment 3 of the present inventive concept will be described with reference to FIGS. 11 and 12.

When the door raises by rolling up the hoist chain 400, the operation of embodiment 2 is the same as embodiment 1.

That is, when the emergency brake device according to the present inventive concept raises along the guide rail 300, the pressing roller 142 also rotates counterclockwise, and thus the rotating body 20 of the acceleration prevention device 100 also rotates counterclockwise.

As described in embodiment 1, when the rotating body 20 rotates counterclockwise, the rotating body 20 normally rotates without limiting the rotational speed, and thus when the door raises, the outer body of the emergency brake device according to embodiment 3 of the present inventive concept does not rotate.

Meanwhile, when the door lowers by loosening the hoist chain 400, and when the door normally lowers within a specified speed, the acceleration prevention device 100 operates in the same manner as embodiment 1.

In this case, as illustrated in FIG. 11, the connection rod 192 sags downward, and the one end of the lower arm 191 coupled to the connection rod also sags downward. Further, the braking shaft 153 coupled to the lower arm 191 is stopped while maintaining a state in which the braking blade 151 coupled to the one end thereof is spaced apart from the guide rail.

Next, in embodiment 3, when an accident (for example, falling of the door) in which the door accelerates and lowers at a specified speed or more occurs due to reasons such as failure of the motor or cutting of the hoist chain, the acceleration prevention device 100 operates as follows.

When the lowering speed of the door is increased, the same operation principle described in embodiment 1 is applied to the acceleration prevention device 100. Thus, a speed at which the rotating body 20 of the acceleration prevention device 100 rotates clockwise increases, and accordingly, the rotating body 20 rotates up to the outer body 40 clockwise.

In this case, as illustrated in FIG. 12, the upper connection pin 193 formed on the second side plate 50 integrally coupled with the outer body 40 rotates clockwise together, and the connection rod 192 coupled to the upper connection pin 193 is pulled upward.

Then, one end of the lower arm 191 connected to the other end of the connection rod 192 is also pulled upward, the other end of the lower arm 191 is fixedly coupled to the braking shaft 153, and as a result, the lower arm 191 rotates the braking shaft 153 clockwise.

Accordingly, as illustrated in FIG. 12, the braking blade 151 coupled to the one end of the braking shaft 153 rotates to come into contract with the surface of the guide rail 300 as if the braking blade 151 strikes the surface of the guide rail 300, and thus the elevator door is prevented from falling using a strong frictional force.

In the emergency brake device according to embodiment 1 and embodiment 3 of the present inventive concept, even when a strong downward pushing force is applied to the emergency brake device attached to the door, the braking blade 151 is not spaced apart from the surface of the guide rail and is not widened. Thus, this emergency brake device is suitable for use on the elevator door having a very large falling load, such as large doors.

That is, referring to FIGS. 6 and 12, even when the emergency brake device attached to the large door is being pushed downward by a very large falling load, the braking shaft 153 to which the braking blade 151 is attached is coupled to the fixing bracket, a phenomenon in which the braking blade 151 is spaced to the outside and is widened cannot occur.

Instead, in embodiment 1 and embodiment 3, when the emergency brake device is pushed downward by a very large falling load, a blade end of the braking blade 151 is pushed upward (that is, rotates about the braking shaft 153 clockwise) due to friction between the braking blade 151 and the surface of the guide rail 300.

However, a length from the braking shaft 153 to the blade end of the braking blade 151 is greater than a length from the braking shaft 153 to the surface of the guide rail 300. As a result, as a clockwise rotating force becomes greater (in other words, the falling load becomes greater), the blade end of the braking blade 151 more deeply penetrates the surface of the guide rail 300, and thus the braking force increases.

Those skilled in the art to which the present inventive concept pertains can improve or change the technical spirit of the present inventive concept in various forms. Thus, the embodiments of the prevent invention described above and illustrated in the drawings should not be construed as limiting the technical spirit of the present inventive concept. That is, when the improvement and change are easy to those skilled in the art, the improvement and change belong to the protection scope of the present inventive concept.

The invention claimed is:

1. An emergency brake device fixedly mounted on both ends of an elevator door and elevating along a guide rail, the emergency brake device comprising:

a fixing bracket (110) coupled to and installed in the elevator door;

an acceleration prevention device (100) installed inside a front side of the fixing bracket (110) and configured to generate a braking force when a door lowering speed of the elevator door increases to a specified speed or more;

a braking blade movable tool (150) configured to receive the braking force of the acceleration prevention device (100) to bring a braking blade (151) into contact with the guide rail (300) so as to stop the lowering of the elevator door; and a braking force transmission tool configured to transmit the braking force between the acceleration prevention device (100) and the braking blade movable tool (150), wherein the acceleration prevention device (100) includes:

a rotating body (20) which has a shape of a disc and in which an accommodation groove recessed toward an inside of the disc is formed in an outer circumferential surface of the disc and a center shaft (21) is installed at a center of the disc;

an outer body (40) which is installed in a fixed state to surround an outer circumferential surface of the rotating body (20) and in which an empty space accommodating the rotating body (20) in a rotatable state is formed and a stop groove (41) recessed toward an outside is formed in an inner circumferential surface forming the empty space; and a moving body (30) accommodated inside the accommodation groove to move in a lengthwise direction of the accommodation groove.

2. The emergency brake device of claim 1, wherein a pressing roller part (140) configured to press the guide rail (300) and operate is installed to interlock with the acceleration prevention device (100).

3. The emergency brake device of claim 1, wherein the braking blade movable tool (150) includes a braking shaft (153) to which the braking blade (151) is connected at one end thereof and an elastic body (170) coupled to and installed in the braking shaft (153), and the braking shaft (153) is rotatably installed in the fixing bracket (110).

4. The emergency brake device of claim 3, wherein the elastic body (170) coupled to and installed in the braking shaft (153) is installed such that a spring body (172) surrounds the braking shaft (153), one spring tail is coupled to the braking shaft (153), and a rotational force is always applied to the braking shaft (153).

5. The emergency brake device of claim 1, wherein the braking force transmission tool includes a driving sprocket (162) coupled to interlock with the acceleration prevention device (100), a driven sprocket (163) installed to interlock with the braking blade movable tool (150), and a connection chain (161) connecting the driving sprocket (162) and the driven sprocket (163).

6. The emergency brake device of claim 1, wherein the braking force transmission tool includes a connection rod (192) having one end rotatably connected to the acceleration prevention device (100) and a lower arm (191) having one end installed to interlock with the braking blade movable tool (150), and the other end of the connection rod (192) and the other end of the lower arm (192) are coupled to rotate relative to each other.

7. The emergency brake device of claim 1, further comprising:

a movable bracket (210) coupled to an inside of the fixing bracket (110) to swing forward or rearward, wherein the acceleration prevention device (100) is positioned inside the movable bracket (210) and is installed to swing forward or rearward together with the movable bracket (210).

8. The emergency brake device of claim 7, wherein the fixing bracket (110) and the movable bracket (210) are connected through a pressing elastic body (230), and the movable bracket (210) is installed in a state in which an elastic force pulled toward the fixing bracket (110) is applied to the movable bracket (210).

9. The emergency brake device of claim 1, wherein a timing adjustment tool (180) configured to adjust a position of a stop groove (41) formed in an inner circumferential surface of an outer body (40) of the acceleration prevention device (100) is installed in the fixing bracket (110).

10. The emergency brake device of claim 9, wherein the timing adjustment tool (180) includes an adjustment piece (181) formed of a long metal piece, a fixing bolt (182) configured to fix a position of an upper end of the adjustment piece (181), and an adjustment bolt (183) configured to adjust a position of a lower end of the adjustment piece.

11. The emergency brake device of claim 1, wherein a protrusion (101) is formed on one side of the acceleration prevention device (100).

12. The emergency brake device of claim 1, wherein the rotating body (20) has a plurality of accommodation grooves, and the plurality of formed accommodation grooves are arranged at equal intervals.

13. The emergency brake device of claim 1, wherein the accommodation groove of the rotating body (20) is an accommodation groove (22) in which an axial line extending from a center axis of the accommodation groove forms a vertical distance(S) without passing through a center of the center axis.

14. An emergency brake device fixedly mounted on both ends of an elevator door and elevating along a guide rail, the emergency brake device comprising:

a fixing bracket (110) coupled to and installed in the elevator door;

an acceleration prevention device (100) installed inside a front side of the fixing bracket (110) and configured to generate a braking force when a lower lowering speed of the elevator door increases to a specified speed or more; and a pressing roller part (140) configured to press the guide rail (300) and operate while interlocking with the acceleration prevention device (100), wherein the acceleration prevention device (100) includes:

a rotating body (20) which has a shape of a disc and in which an accommodation groove recessed toward an inside of the disc is formed in an outer circumferential surface of the disc and a center shaft (21) is installed at a center of the disc;

an outer body (40) which is installed in a fixed state to surround an outer circumferential surface of the rotating body (20) and in which an empty space accommodating the rotating body (20) in a rotatable state is formed and a stop groove (41) recessed toward an outside is formed in an inner circumferential surface forming the empty space; and a moving body (30) accommodated inside the accommodation groove to move in a lengthwise direction of the accommodation groove.

15. The emergency brake device of claim 14, wherein a movable bracket (210) coupled to swing forward or rearward is provided inside the fixing bracket (110), the pressing roller part (140) includes a pressing roller shaft (141) coupled to pass through the movable bracket (210) to swing forward or rearward together with the movable bracket (210) and a pressing roller (142) coupled to one end of the pressing roller shaft (141), and contact and separation occur between the pressing roller (142) and the guide rail (300) according to the forward or rearward swinging of the movable bracket (210).

16. The emergency brake device of claim 15, wherein the acceleration prevention device (100) is installed in the pressing roller shaft (141), an adjustment rod (103) is formed on one side surface of the acceleration prevention device (100), and the acceleration prevention device operates according to a rotational speed of the pressing roller (142).

17. The emergency brake device of claim 15, wherein a timing adjustment tool (180-1) configured to adjust a position of a stop groove (41) formed in an inner circumferential surface of an outer body (40) of the acceleration prevention device (100) is installed in the movable bracket (110).

18. The emergency brake device of claim 17, wherein the timing adjustment tool (180-1) includes an adjustment table (185) formed of a metal piece, an adjustment bolt (187) configured to adjust a vertical position of the adjustment table (185), and a third slot (185) formed vertically long in the adjustment table (185).

19. The emergency brake device of claim 15, wherein the fixing bracket (110) and the movable bracket (210) are connected through a pressing elastic body (230), and the pressing elastic body (230) is configured to apply an elastic force for pressing the guide rail (300) to the pressing roller (142) coupled to the movable bracket (210).

* * * * *